(12) United States Patent
Nakajima et al.

(10) Patent No.: US 11,459,489 B2
(45) Date of Patent: *Oct. 4, 2022

(54) PRESSURE-SENSITIVE ADHESIVE AND ARTICLES INCLUDING SAME

(71) Applicant: RIKEN TECHNOS CORPORATION, Tokyo (JP)

(72) Inventors: Shoko Nakajima, Tokyo (JP); Hitomi Inomata, Tokyo (JP)

(73) Assignee: RIKEN TECHNOS CORPORATION

( * ) Notice: Subject to any disclaimer, the term of this patent is extended or adjusted under 35 U.S.C. 154(b) by 59 days.

This patent is subject to a terminal disclaimer.

(21) Appl. No.: 15/999,881

(22) PCT Filed: Mar. 1, 2016

(86) PCT No.: PCT/JP2016/056222
§ 371 (c)(1),
(2) Date: Aug. 20, 2018

(87) PCT Pub. No.: WO2017/141449
PCT Pub. Date: Aug. 24, 2017

(65) Prior Publication Data
US 2020/0017724 A1    Jan. 16, 2020

(30) Foreign Application Priority Data
Feb. 19, 2016  (JP) ............... JP2016-029583

(51) Int. Cl.
*C09J 7/38*    (2018.01)
*C09J 7/20*    (2018.01)
(Continued)

(52) U.S. Cl.
CPC ............... *C09J 7/385* (2018.01); *B32B 7/12* (2013.01); *B32B 17/10018* (2013.01);
(Continued)

(58) Field of Classification Search
CPC ........ C09J 7/385; C09J 7/20; C09J 2301/312; C09J 2463/00; C09J 2433/00;
(Continued)

(56) References Cited

U.S. PATENT DOCUMENTS 4,077,926 A * 3/1978 Sanderson ............. C09J 133/02
524/508
6,055,823 A   5/2000 Baker et al.
(Continued)

FOREIGN PATENT DOCUMENTS

CN    201019141 Y    2/2008
CN    101441328 A    5/2009
(Continued)

OTHER PUBLICATIONS

Translation of JP 5151982A. See above for date and inventor.*
(Continued)

*Primary Examiner* — Scott R. Walshon
(74) *Attorney, Agent, or Firm* — Bracewell LLP; Brad Y. Chin

(57) ABSTRACT

According to at least one embodiment, there is provided a pressure-sensitive adhesive which includes 100 parts by mass of (A) an acrylic polymer having a glass transition temperature of −50 to −25° C., 0.01-3 parts by mass of (B) a silane coupling agent having an epoxy group, 0.01-0.9 parts by mass of (C) a compound having two or more epoxy groups in the molecule, and 0.01-0.5 parts by mass of (D) an organic polyvalent-metal compound. Another embodiment is a decorative sheet which includes a layer including the pressure-sensitive adhesive. Other embodiments include the front panel of a door for opening/closing a front part of an article main body, which includes a layer including the pressure-sensitive adhesive.

8 Claims, 1 Drawing Sheet

(51) Int. Cl.
*C08K 5/56* (2006.01)
*C09J 11/06* (2006.01)
*B32B 7/12* (2006.01)
*B32B 17/10* (2006.01)
*B32B 27/08* (2006.01)

(52) U.S. Cl.
CPC ............... *B32B 27/08* (2013.01); *C08K 5/56* (2013.01); *C09J 7/20* (2018.01); *C09J 11/06* (2013.01); *C09J 2301/312* (2020.08); *C09J 2400/143* (2013.01); *C09J 2433/00* (2013.01); *C09J 2463/00* (2013.01)

(58) Field of Classification Search
CPC ....... C09J 2400/143; C09J 11/06; B32B 7/12; C08K 5/56
See application file for complete search history.

(56) References Cited

U.S. PATENT DOCUMENTS

| | | | | |
|---|---|---|---|---|
| 10,030,174 | B2* | 7/2018 | Yoneyama | ............... C09J 7/243 |
| 2008/0280086 | A1 | 11/2008 | Sheridan et al. | |
| 2012/0114892 | A1* | 5/2012 | Jung | ........................ B44C 1/105 |
| | | | | 428/41.6 |
| 2014/0208657 | A1 | 7/2014 | Kim et al. | |
| 2016/0046840 | A1* | 2/2016 | Yoneyama | ................. C09J 7/20 |
| | | | | 428/41.3 |

FOREIGN PATENT DOCUMENTS

| | | | |
|---|---|---|---|
| CN | 102839893 A | 12/2012 | |
| CN | 203314200 U | 12/2013 | |
| CN | 103522725 A | 1/2014 | |
| CN | 104422239 A | 3/2015 | |
| CN | 204184984 U | 3/2015 | |
| CN | 105003172 A | 10/2015 | |
| JP | 2000190430 A | 7/2000 | |
| JP | 2007-238853 A * | 9/2007 | |
| JP | 2010060190 A | 3/2010 | |
| JP | 2010131771 A | 6/2010 | |
| JP | 2011032350 A | 2/2011 | |
| JP | 2011037927 A | 2/2011 | |
| JP | 2011512422 A | 4/2011 | |
| JP | 2011128439 A | 6/2011 | |
| JP | 2012062385 A | 3/2012 | |
| JP | 5151982 A * | 12/2012 | ............ C09J 133/08 |
| JP | 2014040017 A | 3/2014 | |
| JP | 2014043101 A | 3/2014 | |
| JP | 2014062709 A | 4/2014 | |
| JP | 2016050285 A | 4/2016 | |
| KR | 20060067404 A * | 6/2006 | |
| TW | 201406895 A | 2/2014 | |
| WO | 2008029766 A1 | 3/2008 | |
| WO | 2009113537 A1 | 9/2009 | |
| WO | 2010079653 A1 | 7/2010 | |
| WO | WO-2014157426 A1 * | 10/2014 | ............... C09J 7/20 |
| WO | 2014203792 A1 | 12/2014 | |
| WO | 2015033754 A1 | 3/2015 | |
| WO | 2015171340 A1 | 11/2015 | |
| WO | 2015182253 A1 | 12/2015 | |
| WO | 2016147733 A1 | 9/2016 | |
| WO | 2016147734 A1 | 9/2016 | |
| WO | 2016147776 A1 | 9/2016 | |

OTHER PUBLICATIONS

Machine translation of JP 2007-238853 A (Year: 2007).*
PCT/JP2016/084794 International Search Report dated Jan. 25, 2017; 2 pgs.
PCT/JP2016/056222 International Search Report dated Jun. 7, 2016; 2 pgs.
PCT/JP2016/056222 Notification Concerning Transmittal of International Preliminary Report on Patentability dated Sep. 4, 2018; 24 pgs.
EP16868622.8 Extended European Search Report dated May 20, 2019; 8 pgs.
EP16890589.1 Extended European Search Report dated Oct. 15, 2019, 8 pgs.
TW105106732 Office Action dated Aug. 30, 2019, 11 pgs.
CN201680068951.X Office Action dated Sep. 29, 2019; 21 pgs.
CN201680082051.0 First Office Action dated May 6, 2020, 15 pgs.
JP2017-552695 Second Office Action dated Dec. 2, 2020, 5 pgs.
CN201680082051.0 Second Office Action dated Jan. 7, 2021, 15 pgs.
TW105106732 Decision of Rejection dated Oct. 30, 2020, 8 pgs.
TW105136889 Second Office Action dated Jan. 7, 2021, 9 pgs.
CN202010731996.9 First Office Action dated Sep. 16, 2021, 12 pages.
KR10-2018-7026193 First Office Action dated Jan. 28, 2022, 9 pgs.
CN202010731996.9 Decision of Rejection dated Apr. 21, 2022, 10 pgs.

* cited by examiner

PRESSURE-SENSITIVE ADHESIVE AND ARTICLES INCLUDING SAME

CROSS REFERENCE TO RELATED APPLICATIONS

This application claims the benefit of and priority to PCT/JP2016/056222, filed on Mar. 1, 2016, entitled (translation), "PRESSURE-SENSITIVE ADHESIVE AND ARTICLES INCLUDING SAME," which claims the benefit of and priority to Japanese Patent Application No. 2016-029583, filed on Feb. 19, 2016, which are hereby incorporated by reference in their entirety into this application.

BACKGROUND

Embodiments relate to a pressure-sensitive adhesive. More specifically, embodiments relate to a pressure-sensitive adhesive that can be suitably used for bonding glass to a decorative sheet and bonding a transparent resin sheet to a decorative sheet.

DESCRIPTION OF RELATED ART

In recent years, glass has drawn attention as a member constituting a front panel of a door body for opening/closing a front part of a main body of an article such as a refrigerator, a washing machine, a cupboard, or a costume shelf, or a flat panel of a lid body for opening/closing a flat part of the main body due to a sense of design with transparency of glass. However, glass is easily cracked due to low impact resistance, has low processability, and is heavy due to high specific gravity disadvantageously, for example.

Therefore, it has been proposed to bond a resin sheet (decorative sheet) provided with a design to a back side of a glass panel substrate also for imparting a scattering prevention function (for example, see JP-A-2014-062709 and JP-A-2010-060190). However, these techniques have a disadvantage that an adhesive force is lowered and peeling occurs in an environment of high temperature and high humidity; a disadvantage that when a decorative sheet is knocked from a back side in a process of producing a door or the like, the pushed part is observed as a knocking flaw occurrence also from a front side of the door or the like to lose designability; a disadvantage that glass is peeled off from a decorative sheet in a step of filling a foam insulation material into a space constituted by a glass front panel, a support frame, and a back panel in a process of producing a door body of a refrigerator, and the like, and a pressure-sensitive adhesive capable of eliminating these problems has been demanded.

In addition, as a front panel of a door body of a refrigerator, it has been proposed to use a laminated sheet obtained by bonding a resin sheet (decorative sheet) provided with a design to a back side of a transparent resin sheet instead of glass (for example, see WO-A-2015/033754). In this case, in order to bond the decorative sheet to the transparent resin sheet, a pressure-sensitive adhesive can be used advantageously from a viewpoint of preventing thermal discoloration of a printed pattern applied to the decorative sheet and thermal deformation of a wrinkled pattern. However, a conventional pressure-sensitive adhesive has a disadvantage that a transparent resin sheet is peeled off from a decorative sheet due to outgas generated from a resin sheet particularly in an environment of high temperature and high humidity; a disadvantage that when a decorative sheet is knocked from a back side in a process of producing a door body or the like, the pushed part is observed as knocking flaw occurrence also from a front side of the door body or the like to lose designability; and a disadvantage that a transparent resin sheet is peeled off from a decorative sheet in a step of filling a foam insulation material in a process of producing a door body of a refrigerator. In order to use a pressure-sensitive adhesive for bonding a transparent resin sheet to a decorative sheet, it is required to eliminate these disadvantages.

As a technique for eliminating the disadvantages of a pressure-sensitive adhesive in an environment of high temperature and high humidity, for example, an "acrylic pressure-sensitive adhesive composition including an acrylic copolymer (A) obtained by copolymerizing a (meth)acrylate and a monomer mixture (a) including a carboxyl group-containing monomer copolymerizable with the (meth)acrylate and a hydroxyl group-containing monomer and having a weight average molecular weight of 500,000 to 2,000,000, and a crosslinking agent (B), in which 0.05 to 1.6 parts by mass of a metal chelate-based crosslinking agent and 0.05 to 0.2 parts by mass of a crosslinking agent having an epoxy group are blended as the crosslinking agent (B) relative to 100 parts by mass of the acrylic copolymer (A)" has been proposed (for example, see JP-A-2011-032350). However, when the inventors tested this composition, it was impossible to eliminate the disadvantage concerning peeling in a foam insulation material filling process and the disadvantage concerning knocking flaw occurrence.

SUMMARY

An object of the various embodiments of the subject application is to provide a pressure-sensitive adhesive that can be suitably used for bonding glass to a decorative sheet and bonding a transparent resin sheet to a decorative sheet and has eliminated the above-described disadvantages, a decorative sheet using the pressure-sensitive adhesive, and an article using the pressure-sensitive adhesive and the decorative sheet.

According to various embodiments, the object of the subject application can be achieved by a pressure-sensitive adhesive having a specific composition, as described above in the following disclosure and recited in the claims.

According to at least one embodiment, there is provided a pressure-sensitive adhesive including: 100 parts by mass of (A) an acrylic polymer having a glass transition temperature of −50 to −25° C.; 0.01 to 3 parts by mass of (B) a silane coupling agent having an epoxy group; 0.01 to 0.9 parts by mass of (C) a compound having two or more epoxy groups in one molecule thereof; and 0.01 to 0.5 parts by mass of (D) an organic polyvalent-metal compound.

According to another embodiment, there is provided a decorative sheet having a layer including the pressure-sensitive adhesive according to various embodiments.

According to at least one embodiment, the decorative sheet has an adhesive strength with glass of 5 N/25 mm or more after a heat treatment at a temperature of 60° C. for 10 minutes.

According to at least one embodiment, the decorative sheet has an adhesive strength residual ratio with glass of 70% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours.

According to at least one embodiment, the decorative sheet has an adhesive strength residual ratio with glass of 70% or more after an immersion treatment in a sodium hydroxide aqueous solution having a concentration of 5% by mass and a temperature of 25° C. for 24 hours.

According to at least one embodiment, the decorative sheet has an adhesive strength with at least one resin selected from the group consisting of an acrylic resin, an aromatic polycarbonate-based resin, and a polyester-based resin other than the acrylic resin and the aromatic polycarbonate-based resin of 5 N/25 mm or more after a heat treatment at a temperature of 60° C. for 10 minutes.

According to at least one embodiment, the decorative sheet has an adhesive strength residual ratio with at least one resin selected from the group consisting of an acrylic resin, an aromatic polycarbonate-based resin, and a polyester-based resin other than the acrylic resin and the aromatic polycarbonate-based resin of 70% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours.

According to at least one embodiment, the decorative sheet has an adhesive strength residual ratio with at least one resin selected from the group consisting of an acrylic resin, an aromatic polycarbonate-based resin, and a polyester-based resin other than the acrylic resin and the aromatic polycarbonate-based resin of 70% or more after an immersion treatment in a sodium hydroxide aqueous solution having a concentration of 5% by mass and a temperature of 25° C. for 24 hours.

According to another embodiment, there is provided a panel constituting a front of a door body for opening/closing an opening of a front of an article main body, the panel including, in order from a front side of the article: (α) a layer of glass or a transparent resin sheet; (β) a layer including the pressure-sensitive adhesive according to various embodiments; and (γ) a layer of a resin film.

According to another embodiment, there is provided a front panel of a door body for opening/closing a front part of an article main body, the panel including, in order from a front side of the article: (γ) a layer of a resin film; (β) a layer including the pressure-sensitive adhesive according to various embodiments; and (α) a layer of glass or a transparent resin sheet.

According to another embodiment, there is provided an article including the pressure-sensitive adhesive according to various embodiments.

According to another embodiment, there is provided an article including the decorative sheet according to various embodiments.

According to another embodiment, there is provided an article including the panel according to various embodiments.

DETAILED DESCRIPTION

Figure 1:
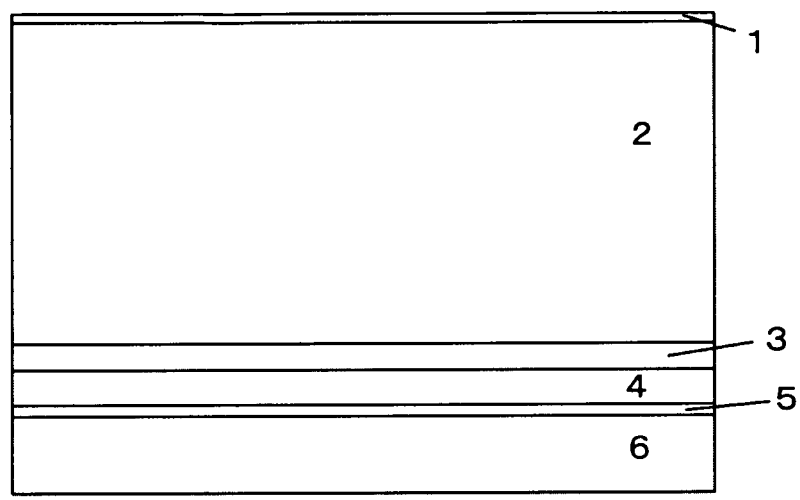
FIG. 1 is a conceptual diagram of a cross section illustrating an example of a panel according to an embodiment.

Here, the term "sheet" is used as a term including a film and a plate. The term "resin" is used as a term including a resin mixture containing two or more resins and a resin composition containing a component other than a resin. The term "front panel" is used in such a manner that the front panel is mutually exchangeable or replaceable with any one of a flat panel, a back panel, a side panel, and a bottom panel. The term "door body" is used in such a manner that the door body is mutually exchangeable or replaceable with a "lid body". The term "front of an article" is not intended to be bound by this definition, but generally means a face of an article to which a user opposes in a case where the article is applied to an application for which the article is normally scheduled, and is not limited to one face.

1. Pressure-Sensitive Adhesive

A pressure-sensitive adhesive according to at least one embodiment includes 100 parts by mass of (A) an acrylic polymer having a glass transition temperature of −50 to −25° C.; 0.01 to 3 parts by mass of (B) a silane coupling agent having an epoxy group; 0.01 to 0.9 parts by mass of (C) a compound having two or more epoxy groups in one molecule thereof; and 0.01 to 0.5 parts by mass of (D) an organic polyvalent-metal compound.

(A) Acrylic Polymer Having a Glass Transition Temperature of −50 to −25° C.

According to at least one embodiment, the acrylic polymer of component (A) exhibits pressure-sensitive adhesiveness as a main agent of the pressure-sensitive adhesive and also plays a role of containing therein components (B) to (D) and another optional component.

According to at least one embodiment, the glass transition temperature of the acrylic polymer of component (A) is −50° C. or higher and preferably −40° C. or higher from a viewpoint of eliminating the above-described disadvantage concerning knocking flaw occurrence.

Meanwhile, the glass transition temperature of the acrylic polymer of component (A) is −25° C. or lower and preferably −30° C. or lower from a viewpoint of improving tackiness (initial adhesiveness). The glass transition temperature of the acrylic polymer of component (A) may be usually −50° C. or higher and −25° C. or lower, preferably −50° C. or higher and −30° C. or lower, −40° C. or higher and −25° C. or lower, or −40° C. or higher and −30° C. or lower.

Here, the glass transition temperature of the acrylic polymer of component (A) is a calculated value determined by a conventional method, that is, a value determined from the following formula (formula of Fox):

$$1/(Tg+273) = W_1/(Tg_1+273) + W_2/(Tg_2+273) + W_3/(Tg_3+273) + \ldots + W_n/(Tg_n+273)$$

(In the formula, Tg represents a glass transition temperature (° C.) of a polymer made from n kinds of monomers, each of $W_1$, $W_2$, $W_3$ ..., and $W_n$ represents % by mass of each monomer in a monomer composition, and each of $Tg_1$, $Tg_2$, $Tg_3$ ... and $Tg_n$ represents a glass transition temperatures (° C.) of a homopolymer of each monomer.

As the Tg of each homopolymer, for example, a numerical value described in a polymer handbook and the like can be used.

According to at least one embodiment, the acrylic polymer of component (A) is not limited as long as having a glass transition temperature of −50 to −25° C., and any acrylic polymer can be used. The molecular weight of acrylic polymer of component (A) is not particularly limited as long as having a glass transition temperature of −50 to −25° C. Examples of the acrylic polymer include a polymer and a copolymer made from, as a monomer, a single kind or a mixture of two or more kinds of an alkyl (meth)acrylate monomer, a carboxyl group-containing monomer, an epoxy group-containing monomer, a hydroxyl group-containing (meth)acrylate monomer, and the like. Note that the term (meth)acrylic acid means acrylic acid or methacrylic acid.

Examples of the alkyl (meth)acrylate monomer include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, and stearyl (meth)acrylate.

Examples of the carboxyl group-containing monomer include acrylic acid, methacrylic acid, itaconic acid, and β-carboxyethyl (meth)acrylate. This monomer species also includes a compound containing a (meth)acrylic acid backbone in a part of a molecule thereof, such as itaconic acid.

Examples of the epoxy group-containing monomer include glycidyl (meth)acrylate and 4-hydroxybutyl (meth)acrylate glycidyl ether.

Examples of the hydroxyl group-containing (meth)acrylate monomer include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of a commercially available product thereof include "Acrybase LKG-1010" (trade name): glass transition temperature −34° C., "Acrybase LKG-1012" (trade name): glass transition temperature −35° C., "Acrybase LKG-1001" (trade name): glass transition temperature −40° C.; and "Acrybase LKG-1007" (trade name): glass transition temperature −44° C., available from Fujikura Kasei Co., Ltd.

These compounds can be used singly or in a mixture of two or more kinds thereof as the acrylic polymer of component (A). In a case where a mixture is used as component (A), it is only required to set the glass transition temperature of the mixture within the above-described range. In a case where a mixture is used as component (A), preferably, it may be only required to set the glass transition temperature of a component having the highest glass transition temperature to −25° C. or lower, and to set the glass transition temperature of a component having the lowest glass transition temperature to −50° C. or higher.

(B) Silane Coupling Agent Having an Epoxy Group

According to at least one embodiment, the silane coupling agent is a silane compound having at least two kinds of different reactive groups of a hydrolyzable group (for example, an alkoxy group such as a methoxy group or an ethoxy group; an acyloxy group such as an acetoxy group; or a halogen group such as a chloro group) and an organic functional group (for example, an amino group, a vinyl group, an epoxy group, a methacryloxy group, an acryloxy group, or an isocyanate group). As the silane coupling agent of component (B), a silane coupling agent having at least an epoxy group as an organic functional group is used. By having an epoxy group, the silane coupling agent of component (B) can chemically bond to or strongly interact with components (A) and (C). The silane coupling agent of component (B) may have an organic functional group other than an epoxy group within a range not inhibiting such chemical bonding or interaction. By an action of an epoxy group, appropriate hardness can be imparted to a pressure-sensitive adhesive, and a disadvantage concerning knocking flaw occurrence can be eliminated. In addition, the silane coupling agent of component (B) has a hydrolyzable group and therefore can eliminate the above-described disadvantage concerning peeling in a foam insulation material filling process in spite of having sufficient hardness to eliminate a disadvantage concerning knocking flaw occurrence. Furthermore, the silane coupling agent of component (B) has an epoxy group as an organic functional group and therefore has excellent miscibility with components (C) and (D).

Examples of the silane coupling agent having an epoxy group include 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane. These compounds can be used singly or in a mixture of two or more kinds thereof as the silane coupling agent of component (B).

According to at least one embodiment, the blending amount of the silane coupling agent of component (B) is usually 0.01 part by mass or more, preferably 0.03 parts by mass or more relative to 100 parts by mass of component (A) from a viewpoint of eliminating the above-described disadvantage concerning peeling in a foam insulation material filling process and the above-described disadvantage concerning knocking flaw occurrence. Meanwhile, the blending amount of the silane coupling agent of component (B) is usually 3 parts by mass or less, preferably 1.5 parts by mass or less from a viewpoint of improving heat cycle resistance and alkali resistance. The blending amount of the silane coupling agent of component (B) may be usually 0.01 part by mass or more and 3 parts by mass or less, preferably 0.01 part by mass or more and 1.5 parts by mass or less, 0.03 parts by mass or more and 3 parts by mass or less, or 0.03 parts by mass or more and 1.5 parts by mass or less relative to 100 parts by mass of component (A).

(C) Compound Having Two or More Epoxy Groups in One Molecule Thereof

According to at least one embodiment, the epoxy group-containing compound of component (C) has two or more epoxy groups in one molecule thereof and can chemically bond to or strongly interact with components (A) and (B). This imparts appropriate hardness to a pressure-sensitive adhesive and can eliminate the above-described disadvantage concerning knocking flaw occurrence. In addition, the epoxy group-containing compound of component (C) exhibits specific high compatibility with component (D) and can retain pressure-sensitive adhesive strength and transparency even in an environment of high temperature and high humidity. Note that the epoxy group-containing compound of component. (C) is clearly distinguished from component (B) in having no hydrolyzable group. According to various embodiments, the silane compound having two or more epoxy groups in one molecule thereof and having a hydrolyzable group is clarified into component (B). The epoxy group-containing compound of component (C) is not particularly limited as long as having two or more epoxy groups in one molecule thereof and having no hydrolyzable group.

Examples of the epoxy group-containing compound of component (C) include 1,3-bis(N,N'-diglycidylaminomethyl) cyclohexane, N,N,N,N'-tetraglycidyl-m-xylenediamine, diglycidyl aniline, diglycidyl amine, a bisphenol A-epichlorohydrin type epoxy resin, ethylene glycol diglycidyl ether, polyethylene glycol diglycidyl ether, glycerin diglycidyl ether, glycerin triglycidyl ether, 1,6-hexanediol diglycidyl ether, and trimethylolpropane triglycidyl ether. These compounds can be used singly or in a mixture of two or more kinds thereof as the epoxy group-containing compound of component (C).

According to at least one embodiment; the blending amount of the epoxy group-containing compound of component (C) is 0.01 part by mass or more, preferably 0.03 parts by mass or more, and more preferably 0.04 parts by mass or more relative to 100 parts by mass of component (A) from a viewpoint of eliminating the above-described disadvantage concerning peeling in a foam insulation material filling process and the above-described disadvantage concerning knocking flaw occurrence. Meanwhile, the blending amount of the epoxy group-containing compound of component (C) is 0.9 parts by mass or less, preferably 0.6 parts by mass or less, and more preferably 0.5 parts by mass or less from a viewpoint of improving adhesiveness under heat. In addition, the blending amount of the epoxy group-containing compound of component (C) may be preferably 0.3 parts by mass or less and more preferably 0.2 parts by mass or less from a viewpoint of an anchoring property to an adherend. In addition, the blending amount of the epoxy group-containing compound of component (C) may be preferably 0.3 parts by mass or more and more preferably 0.4 parts by mass or more from a viewpoint of preventing cohesive failure of a pressure-sensitive adhesive layer during a heat cycle. In some embodiments, the blending amount of the epoxy group-containing compound of component (C) may be usually 0.01 part by mass or more and 0.9 parts by mass or less, and may be alternatively 0.01 part by mass or more and 0.6 parts by mass or less, 0.01 part by mass or more and 0.5 parts by mass or less, 0.01 part by mass or more and 0.3 parts by mass or less, 0.01 part by mass or more and 0.2 parts by mass or less, 0.03 parts by mass or more and 0.9 parts by mass or less, 0.03 parts by mass or more and 0.6 parts by mass or less, 0.03 parts by mass or more and 0.5 parts by mass or less, 0.03 parts by mass or more and 0.3 parts by mass or less, 0.03 parts by mass or more and 0.2 parts by mass or less, 0.04 parts by mass or more and 0.9 parts by mass or less, 0.04 parts by mass or more and 0.6 parts by mass or less, 0.04 parts by mass or more and 0.5 parts by mass or less, 0.04 parts by mass or more and 0.3 parts by mass or less, 0.04 parts by mass or more and 0.2 parts by mass or less, 0.3 parts by mass or more and 0.9 parts by mass or less, 0.3 parts by mass or more and 0.6 parts by mass or less, 0.3 parts by mass or more and 0.5 parts by mass or less, 0.4 parts by mass or more and 0.9 parts by mass or less, 0.4 parts by mass or more and 0.6 parts by mass or less, or 0.4 parts by mass or more and 0.5 parts by mass or less relative to 100 parts by mass of component (A).

(D) Organic Polyvalent-Metal Compound

According to at least one embodiment, the organic polyvalent-metal compound of component (D) serves to assist a chemical reaction and interaction between component (C) and component (A) or (B). This imparts appropriate hardness to a pressure-sensitive adhesive and can eliminate the above-described disadvantage concerning knocking flaw occurrence. In addition, the organic polyvalent-metal compound of component (D) exhibits specific high compatibility with component (C) and can retain pressure-sensitive adhesive strength and transparency even in an environment of high temperature and high humidity.

Examples of the organic polyvalent-metal compound of component (D) include a compound in which a polyvalent-metal such as aluminum, zirconium, or titanium is bonded covalently or coordinately to an organic compound such as an alkyl ester, an alcohol compound, a carboxylic acid compound, an ether compound, or a ketone compound.

Examples of an organic aluminum compound that can be used as the organic polyvalent-metal compound of component (D) include aluminum trisacetylacetonate, aluminum ethylacetoacetate-diisopropylate, aluminum bisethylacetoacetate-monoacetylacetonate, aluminum trisethylacetoacetate, aluminum ethylate, aluminum isopropylate, aluminum diisopropylate monosecondary butylate, and aluminum secondary butylate.

Examples of an organic zirconium compound that can be used as the organic polyvalent-metal compound of component (D) include n-propyl zirconate, n-butyl zirconate, zirconium tetraacetyl acetonate, zirconium monoacetyl acetonate, and zirconium ethyl acetoacetate.

Examples of an organic titanium compound that can be used as the organic polyvalent-metal compound of component (D) include tetra-i-propoxytitanium, tetra-n-butoxytitanium, tetrakis(2-ethylhexyloxy) titanium, titanium-i-propoxy octylene glycolate, di-i-propoxy-bis (acetylacetonato) titanium, propane dioxytitanium bis(ethyl acetate), propane dioxytitanium bis(ethyl acetoacetate), tri-n-butoxy titanium monostearate, di-i-propoxytitanium distearate, titanium stearate, di-i-propoxytitanium diisostearate, (2-n-butoxycarbonylbenzoyloxy) tributoxytitanium, and di-n-butoxy-bis(triethanolaminato) titanium.

These compounds can be used singly or in a mixture of two or more kinds thereof as the organic polyvalent-metal compound of component (D).

According to at least one embodiment, the blending amount of the organic polyvalent-metal compound of component (D) is usually 0.01 part by mass or more, preferably 0.03 parts by mass or more relative to 100 parts by mass of component (A) from a viewpoint of obtaining an effect of component (D). Meanwhile, the blending amount of the organic polyvalent-metal compound of component (D) is 0.5 parts by mass or less and preferably 0.3 parts by mass or less from a viewpoint of improving adhesiveness under heat. The blending amount of the organic polyvalent-metal compound of component (D) may be usually 0.01 part by mass or more and 0.5 parts by mass or less, preferably 0.01 part by mass or more and 0.3 parts by mass or less, 0.03 parts by mass or more and 0.5 parts by mass or less, or 0.03 parts by mass or more and 0.3 parts by mass or less relative to 100 parts by mass of component (A).

The pressure-sensitive adhesive according to at least one embodiment may further include an optional component(s) other than components (A) to (D) as desired within a range not contradictory to an object of the various embodiments. Examples of the optional component include an additive such as a photopolymerization initiator, a compound having two and more isocyanate groups in one molecule thereof, an epoxy resin curing accelerator, an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, a pigment, or a filler. The blending amount of the optional component is usually about 0.01 to 10 parts by mass relative to 100 parts by mass of component (A).

Preferable examples of the optional component include an epoxy resin curing accelerator. By using the epoxy resin curing accelerator in an amount usually of about 1 to 200 parts by mass, preferably of about 10 to 100 parts by mass relative to 100 parts by mass of component (C), reactivity of component (C) can be controlled. Examples of the epoxy resin curing accelerator include an imidazole compound such as 2-methylimidazole, 2-ethylimidazole, 2-ethyl-4-methylimidazole, 2-phenylimidazole, 2-phenyl-4-methylimidazole, 2-phenyl-4-methyl-5-hydroxymethylimidazole, or 2-phenyl-4,5-dihydroxymethylimidazole, and derivatives thereof; 1,8-diazabicyclo [5,4,0]-7-undecene, 1,5-diazabicyclo [4,3,0]-5-nonene, and derivatives thereof (for example, carboxylates, sulfonates, phenolates, and phenol novolak resin salts thereof); a triorganophosphine compound such as triphenylphosphine, tributylphosphine, tris(p-methylphenyl) phosphine, tris(p-methoxyphenyl) phosphine, or tris(p-ethoxyphenyl) phosphine; a quaternary phosphonium salt, triphenylphosphine-triphenyl borate, tetraphenyl phosphine-tetraphenyl borate, and triethylene ammonium-triphenyl borate. These compounds can be used singly or in a mixture of two or more kinds thereof as the epoxy resin curing accelerator.

2. Decorative Sheet

According to at least one embodiment, the decorative sheet is characterized by having a layer including the pressure-sensitive adhesive according to various embodiments. The decorative sheet according to various embodiments usually has a substrate layer on which this layer including the pressure-sensitive adhesive is formed. The material, laminated structure, and thickness of the substrate layer are not particularly limited as long as a layer including the pressure-sensitive adhesive can be formed on the substrate layer. Usually, the decorative sheet according to various embodiments is not limited and can have any layer configuration as long as having a layer including the pressure-sensitive adhesive according to various embodiments on a side of a panel substrate to which glass or a transparent resin sheet is bonded. Typically, the substrate layer is a resin film layer such as a transparent resin film or a colored resin film. Hereinafter, a preferable embodiment of the decorative sheet will be described with reference to an example in which the decorative sheet is bonded to a panel substrate made of glass or a transparent resin sheet to be used.

2-1. First Embodiment of Decorative Sheet

A first embodiment is a decorative sheet constituting a front panel by bonding the decorative sheet to a back side of a panel substrate made of glass or a transparent resin sheet, in which the decorative sheet has a layer including the pressure-sensitive adhesive according to various embodiments on a front side (side to which the panel substrate is bonded) surface of a transparent resin film which is a substrate layer directly or via an anchor coat.

According to at least one embodiment, the thickness of the layer including the pressure-sensitive adhesive is not particularly limited but may be usually 15 μm or more, preferably 20 μm or more from a viewpoint of pressure-sensitive adhesive strength. In addition, the thickness of the layer including the pressure-sensitive adhesive may be usually 100 μm or less, preferably 60 μm or less from a viewpoint of thickness reduction. The thickness of the layer including the pressure-sensitive adhesive according to various embodiments may be usually 15 μm or more and 100 μm or less, preferably 15 μm or more and 60 μm or less, 20 μm or more and 100 μm or less, or 20 μm or more and 60 μm or less.

A method for forming the layer including the pressure-sensitive adhesive according to various embodiments on a front side surface of the transparent resin film is not limited, and a known web coating method can be used. Examples of the method include roll coating, gravure coating, reverse coating, roll brushing, spray coating, air knife coating, and die coating. In addition, in forming the pressure-sensitive adhesive layer, a known diluting solvent can be used, as desired, in order to dilute the pressure-sensitive adhesive to a concentration which allows easy coating. Examples of the diluting solvent include 1-methoxy-2-propanol, isopropanol, ethyl acetate, n-butyl acetate, toluene, methyl ethyl ketone, methyl isobutyl ketone, diacetone alcohol, and acetone.

As an anchor coating agent for forming the anchor coat, a known agent such as a polyester, an acrylate, a polyurethane, an acrylic urethane, or a polyester urethane can be used, for example.

A method for forming the anchor coat using the anchor coating agent is not particularly limited, and a known web coating method can be used. Specific examples of the method include roll coating, gravure coating, reverse coating, roll brushing, spray coating, air knife coating, and die coating.

According to at least one embodiment, the thickness of the anchor coat is usually about 0.1 to 5 μm, preferably 0.5 to 2 μm.

The transparent resin film is not limited, and any transparent resin film can be used. Examples of the transparent resin film include a polyester-based resin such as an aromatic polyester or an aliphatic polyester; an acrylic resin; a polycarbonate-based resin; a polyolefin-based resin such as polyethylene, polypropylene, or polymethylpentene; a cellulose-based resin such as cellophane, triacetylcellulose, diacetylcellulose, or acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, or a styrene-ethylene-ethylene-propylene-styrene copolymer; a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, and polyethersulfone. These films include an unstretched film, a uniaxially stretched film, and a biaxially stretched film. In addition, the transparent resin film includes a laminated film obtained by laminating two or more layers of one or more kinds thereof.

In a case where the transparent resin film is a laminated film, a lamination method is not limited, and lamination can be performed by any method. Examples of the method include a method including obtaining each resin film by any method and then subjecting the resin film to dry lamination or heat lamination; a method including melting each constituent material with an extruder to obtain a laminated film by T-die co-extrusion using a feed block process, a multi-manifold process, or a stack plate process; an extrusion lamination method including obtaining at least one resin film by any method and then melting and extruding another resin film onto the resin film; a method including forming a resin film by melt extrusion onto any film substrate or by applying and drying a coating material including a constituent material and a solvent thereonto, peeling the formed resin film from the film substrate, and transferring the resin film onto another resin film; and a method including two or more of these methods in any combination.

In a case where the transparent resin film is a laminated film, embossing may be applied between any layers, as desired, in order to enhance the sense of design.

A printed layer may be disposed on a front side (side to which the panel substrate is bonded) surface of the transparent resin film, as desired, in order to enhance the sense of design. In a case where the transparent resin film is a laminated film, a printed layer may be disposed between any layers, as desired, in order to enhance the sense of design. The printed layer can be formed by printing any pattern using any ink and any printing machine. At this time, printing may be performed partially or using a transparent ink from a viewpoint of further enhancing the sense of depth. In addition, the number of printed layers is not limited to one, but may be two or more.

A colored resin film may be further laminated on a back side (opposite side to a surface to which the panel substrate is bonded) surface of the transparent resin film. By laminating a colored resin film on the back side surface of the transparent resin film, a design can be imparted by the color of the colored resin film. In addition, by laminating the colored resin film, it is possible to conceal what is present on a back side of the decorative sheet (for example, a foam insulation material).

According to at least one embodiment, the colored resin film is not limited, and any colored resin film can be used. Examples of the colored resin film include a polyester-based resin such as an aromatic polyester or an aliphatic polyester; an acrylic resin; a polycarbonate-based resin; a poly(meth)acrylamide-based resin; a polyolefin-based resin such as polyethylene, polypropylene, or polymethylpentene; a cellulose-based resin such as cellophane, triacetylcellulose, diacetylcellulose, or acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, or a styrene-ethylene-ethylene-propylene-styrene copolymer; a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, and polyethersulfone. These films include an unstretched film, a uniaxially stretched film, and a biaxially stretched film. In addition, the colored resin film includes a laminated film sheet obtained by laminating two or more layers of one or more kinds thereof.

A printed layer may be disposed between layers of the transparent resin film and the colored resin film, as desired, in order to enhance the sense of design. The printed layer can be disposed in order to impart high designability to the decorative sheet according to at least one embodiment. The printed layer can be formed by printing any pattern using any ink and any printing machine. In addition, the printed layer may be formed so as to serve also as a concealing layer instead of the colored resin film.

Printing can be performed directly or via an anchor coat entirely or partially on a back side surface of the transparent resin film or on a front side surface of the colored resin film. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brickwork pattern, a parquet pattern, and a patchwork. As the printing ink, an ink obtained by appropriately mixing a pigment, a solvent, a stabilizer, a plasticizer, a catalyst, a curing agent, and the like with a binder can be used. Examples of the binder include a resin such as a polyurethane-based resin, a vinyl chloride-vinyl acetate-based copolymer resin, a vinyl chloride-vinyl acetate-acrylic copolymer resin, a chlorinated polypropylene-based resin, an acrylic resin, a polyester-based resin, a polyamide-based resin, a butyral-based resin, a polystyrene-based resin, a nitrocellulose-based resin, or a cellulose acetate-based resin, and a resin composition thereof. In addition, in order to provide a metal-like design, aluminum, tin, titanium, indium, oxides thereof, or the like may be vapor-deposited directly or via an anchor coat entirely or partially on a back side surface of the transparent resin sheet or on a front side surface of the colored resin film by a known method.

Lamination of the transparent resin film and the colored resin film is not particularly limited and can be performed by any method. Examples of the method include heat lamination and dry lamination.

The thickness of the decorative sheet according to at least one embodiment is not particularly limited, but may be usually 25 μm or more, preferably 35 μm or more, and more preferably 45 μm or more from a viewpoint of imparting a scattering prevention function. In addition, the thickness of the decorative sheet according to at least one embodiment may be usually 25 μm or more, preferably 50 μm or more, and more preferably 100 μm or more from a viewpoint of more reliably eliminating the above-described disadvantage concerning knocking flaw occurrence. In addition, the thickness of the decorative sheet according to at least one embodiment may be usually 1500 μm or less, preferably 800 μm or less, and more preferably 400 μm or less from a viewpoint of meeting a demand for thickness reduction of an article. The thickness of the decorative sheet according to at least one embodiment may be usually 25 μm or more and 1500 μm or less, and may be alternatively 25 μm or more and 800 μm or less, 25 μm or more and 400 μm or less, 35 μm or more and 1500 μm or less, 35 μm or more and 800 μm or less, 35 μm or more and 400 μm or less, 45 μm or more and 1500 μm or less, 45 μm or more and 800 μm or less, 45 μm or more and 400 μm or less, 50 μm or more and 1500 μm or less, 50 μm or more and 800 μm or less, 50 μm or more and 400 μm or less, 100 μm or more and 1500 μm or less, 100 μm or more and 800 μm or less, or 100 μm or more and 400 μm or less.

2-2. Second Embodiment of Decorative Sheet

A second embodiment is a decorative sheet constituting a front panel by bonding the decorative sheet to a back side of a panel substrate made of glass or a transparent resin sheet, in which the decorative sheet has a layer including the pressure-sensitive adhesive according to at least one embodiment on a front side (side to which the panel substrate is bonded) surface of a colored resin film which is a substrate layer directly or via an anchor coat. A design can be imparted by the color of the colored resin film. In addition, it is possible to conceal what is present on a back side (for example, a foam insulation material) by the color of the colored resin film.

The colored resin film is not limited, and any colored resin film can be used. Specific examples of the colored resin film are as described above for the first embodiment. As the colored resin film, one of these or a laminated film of one or more of these can be used.

The thickness of the layer including the pressure-sensitive adhesive according to at least one embodiment is not particularly limited but may be usually 15 μm or more, preferably 20 μm or more from a viewpoint of pressure-sensitive adhesive strength. In addition, the thickness of the layer including the pressure-sensitive adhesive may be usually 100 μm or less, preferably 60 μm or less from a viewpoint of thickness reduction. The thickness of the layer including the pressure-sensitive adhesive according to at least one embodiment may be usually 15 μm or more and 100 μm or less, preferably 15 μm or more and 60 μm or less, 20 μm or more and 100 μm or less, or 20 μm or more and 60 μm or less.

A method for forming a layer including the pressure-sensitive adhesive according to at least one embodiment on a front side surface of the colored resin film directly or via an anchor coat is not limited, and a known web coating method can be used. A specific method is similar to that in the case of forming a layer including the pressure-sensitive adhesive on a front side surface of the transparent resin film in the first embodiment.

Any printed layer may be disposed entirely or partially on a front side surface of the colored resin film. The printed layer can be disposed in order to impart high designability to the decorative sheet according to at least one embodiment. The printed layer can be formed by printing any pattern using any ink and any printing machine. A method for disposing the printed layer is as described above.

The thickness of the decorative sheet according to the second embodiment is not particularly limited and may be arbitrary. A preferable range of the thickness of the decorative sheet according to at least one embodiment is similar to that described above in the description of the first embodiment.

2-3. Third Embodiment of Decorative Sheet

A third embodiment is a decorative sheet constituting a front panel by bonding the decorative sheet to a front side of a panel substrate made of glass or a transparent resin sheet, in which the decorative sheet preferably has a layer including the pressure-sensitive adhesive according to at least one embodiment on a back side (side to which the panel substrate is bonded) surface of a transparent resin film which is a substrate layer directly or via an anchor coat in order to utilize transparency of the panel substrate as a design. By bonding the decorative sheet to a front side of the glass panel substrate, a scattering prevention function is easily exhibited. By bonding the decorative sheet to a front side of the panel substrate made of a transparent resin sheet, a scratch prevention effect can be imparted.

The transparent resin film is not limited, and any transparent resin film can be used. Specific examples of the film are as described above for the first embodiment. As the transparent resin film, one of these or a laminated film of one or more of these can be used.

The thickness of the layer including the pressure-sensitive adhesive according to at least one embodiment is not particularly limited but may be usually 15 μm or more, preferably 20 μm or more from a viewpoint of pressure-sensitive adhesive strength. In addition, the thickness of the layer including the pressure-sensitive adhesive may be usually 100 μm or less, preferably 60 μm or less from a viewpoint of thickness reduction. The thickness of the layer including the pressure-sensitive adhesive according to at least one embodiment may be usually 15 μm or more and 100 μm or less, preferably 15 μm or more and 60 μm or less, 20 μm or more and 100 μm or less, or 20 μm or more and 60 μm or less.

A method for forming a layer including the pressure-sensitive adhesive according to at least one embodiment on a back side (side to which the panel substrate is bonded) surface of the transparent resin film directly or via an anchor coat is not limited, and a known web coating method can be used. A specific method is similar to that in the case of forming a layer including the pressure-sensitive adhesive on a front side surface of the transparent resin film in the first embodiment.

Any printed layer may be disposed on a front side surface and/or on a back side surface of the transparent resin film. The printed layer can be disposed in order to impart high designability to the decorative sheet according to at least one embodiment. The printed layer can be formed by printing any pattern using any ink and any printing machine. In order to utilize transparency of a front panel as a design, the printed layer is preferably disposed partially or by using a transparent ink. A method for disposing the printed layer is as described above.

A front side surface of the decorative sheet according to the third embodiment preferably has a surface protective layer. The surface protective layer can increase external scratch resistance and solvent resistance of the decorative sheet.

Examples of the surface protective layer include a resin coating film such as a hard coat or a thermoplastic resin coat. A coating material used for forming the resin coating film preferably has high transparency and high glossiness from a viewpoint of designability.

A coating material used for forming the hard coat preferably has high transparency and high glossiness from a viewpoint of designability. Examples of such a hard coat forming coating material include an active energy ray-curable resin composition.

Examples of the active energy ray-curable resin composition include a composition including an active energy ray-curable resin together with a compound having two or more isocyanate groups (—N=C=O) in one molecule thereof and/or a photopolymerization initiator. The active energy ray-curable resin composition can be polymerized and cured by an active energy ray such as an ultraviolet ray or an electron ray to form a hard coat.

Examples of the active energy ray-curable resin include one or more selected from a (meth)acryloyl group-containing prepolymer or oligomer such as polyurethane (meth)acrylate, polyester (meth)acrylate, polyacryl (meth)acrylate, epoxy (meth)acrylate, polyalkylene glycol poly(meth)acrylate, or polyether (meth)acrylate; a (meth)acryloyl group-containing monofunctional reactive monomer such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate, or trimethylsiloxyethyl methacrylate; a monofunctional reactive monomer such as N-vinylpyrrolidone or styrene; a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate or trimethylolethane tri(meth)acrylate; a (meth)acryloyl group-containing tetrafunctional reactive monomer such as pentaerythritol tetra (meth)acrylate; and a (meth)acryloyl group-containing hexafunctional reactive monomer such as dipentaerythritol hexaacrylate, and a resin including one or more selected from these monomers as constituent monomers. These compounds can be used singly or in a mixture of two or more kinds thereof as the active energy ray-curable resin.

Note that the term (meth)acrylate means an acrylate or a methacrylate here.

Examples of the compound having two or more isocyanate groups in one molecule thereof include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, or a biuret form of hexamethylene diisocyanate; and a urethane crosslinking agent such as a blocked isocyanate of the polyisocyanate. These compounds can be used singly or in a mixture of two or more kinds thereof as the compound having two or more isocyanate groups in one molecule thereof. In addition, in crosslinking, a catalyst such as dibutyltin dilaurate or dibutyltin diethylhexoate may be added as necessary.

Examples of the photopolymerization initiator include a benzophenone-based compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, or 2,4,6-trimethylbenzophenone; a benzoin-based compound such as benzoin, benzoin methyl ether, benzoin ethyl ether, benzoin isopropyl ether, or benzyl methyl ketal; an acetophenone-based compound such as acetophenone, 2,2-dimethoxy-2-phenylacetophenone, or 1-hydroxycyclohexyl phenyl ketone; an anthraquinone-based compound such as methylanthraquinone, 2-ethylanthraquinone, or 2-amylanthraquinone; a thioxanthone-based compound such as thioxanthone, 2,4-diethylthioxanthone, or 2,4-diisopropylthioxanthone; an alkylphenone-based compound such as acetophenone dimethyl ketal; a triazine-based compound; a biimidazole compound; an acylphosphine oxide-based compound; a titanocene-based compound; an oxime ester-based compound; an oxime phenylacetate-based compound; a hydroxyketone-based compound; and an aminobenzoate-based compound. These compounds can be used singly or in a mixture of two or more kinds thereof as the photopolymerization initiator.

In addition, the active energy ray-curable resin composition may include one or more additives such as an antistatic agent, a surfactant, a leveling agent, a thixotropy-imparting agent, a stain-proofing agent or an anti-fouling agent, a printability improver, an antioxidant, a weather resistance stabilizer, a light resistance stabilizer, an ultraviolet absorber, a heat stabilizer, a colorant, or a filler as desired.

Among the optional components used for the active energy ray-curable resin composition as desired, fine particles having an average particle size of 1 nm to 300 nm are preferable. By using 1 to 300 parts by mass, preferably 20 to 100 parts by mass of the fine particles relative to 100 parts by mass of active energy ray-curable resin components, the hardness of the hard coat can be increased.

Both inorganic fine particles and organic fine particles can be used as the fine particles. Examples of the inorganic fine particles include silica (silicon dioxide); metal oxide fine particles such as aluminum oxide, zirconia, titania, zinc oxide, germanium oxide, indium oxide, tin oxide, indium tin oxide, antimony oxide, or cerium oxide; metal fluoride fine particles such as magnesium fluoride or sodium fluoride; metal fine particles; metal sulfide fine particles; and metal nitride fine particles. Examples of the organic fine particles include resin beads such as a styrene-based resin, an acrylic resin, a polycarbonate-based resin, an ethylene-based resin, or a cured resin of an amino-based compound and formaldehyde. These resins can be used singly or in combination of two or more kinds thereof.

In addition, in order to enhance dispersibility of fine particles in a coating material or enhance the hardness of a hard coat obtained, fine particles the surfaces of which have been treated with a silane-based coupling agent such as vinylsilane or aminosilane; a titanate-based coupling agent; an aluminate-based coupling agent; an organic compound having a reactive functional group such as an ethylenically unsaturated bond group such as a (meth)acryloyl group, a vinyl group, or an allyl group, or an epoxy group; a surface-treatment agent such as a fatty acid or a fatty acid metal salt; or the like may be used.

Among these compounds, fine particles of silica or aluminum oxide are preferable in order to obtain a hard coat having higher hardness. Fine particles of silica are more preferable. Examples of commercially available silica fine particles include Snowtex (trade name) available from Nissan Chemical Industries, Ltd. and Quartron (trade name) available from Fuso Chemical Co., Ltd.

According to at least one embodiment, the average particle size of the fine particles may be usually 300 nm or less, preferably 200 nm or less, and more preferably 120 nm or less from viewpoints of retaining transparency of a hard coat and reliably obtaining a hardness-improving effect of a hard coat. Meanwhile, the lower limit of the average particle size is not particularly specified, but the average particle size of particles usually available is about 1 nm at the finest.

According to at least one embodiment, the average particle size of the fine particles is a particle size at which a cumulative value from the smallest particle size reaches 50% by mass in a particle size distribution curve measured using a laser diffraction/scattering particle size analyzer "MT 3200 II" (trade name) available from Nikkiso Co., Ltd.

The active energy ray-curable resin composition may include a solvent as desired for dilution to a concentration which allows easy coating. The solvent is not particularly limited as long as the solvent neither reacts with components of the curable resin composition and other optional components nor catalyzes (promotes) a self-reaction (including a degradation reaction) of these components. Examples of the solvent include 1-methoxy-2-propanol, isopropanol, ethyl acetate, n-butyl acetate, toluene, methyl ethyl ketone, methyl isobutyl ketone, diacetone alcohol, and acetone. As the solvent, one or more of these compounds can be used.

The active energy ray-curable resin composition can be obtained by mixing and stirring these components.

A coating material used for forming the thermoplastic resin coat preferably has high transparency and high glossiness from a viewpoint of designability. Examples of such a thermoplastic resin coat forming coating material include a coating material prepared by dissolving a thermoplastic resin in an organic solvent. By applying and drying the thermoplastic resin coat forming coating material, a thermoplastic resin coat can be formed.

Examples of the thermoplastic resin include a urethane-based resin, a polyester-based resin, an acrylic resin, a vinyl acetate-based resin, a vinyl chloride-based resin, a silicone-based resin, and a fluorine-based resin. Among these compounds, a urethane-based resin, a polyester-based resin, and an acrylic resin are preferable. These compounds can be used singly or in a mixture of two or more kinds thereof as the thermoplastic resin.

Examples of the organic solvent include 1-methoxy-2-propanol, ethyl acetate, n-butyl acetate, toluene, methyl ethyl ketone, methyl isobutyl ketone, diacetone alcohol, and acetone. These compounds can be used singly or in a mixture of two or more kinds thereof as the organic solvent.

According to at least one embodiment, the thermoplastic resin coat forming coating material may include one or more additives such as an antistatic agent, a surfactant, a leveling agent, a thixotropy-imparting agent, a stain-proofing agent (or an antifouling agent), a printability improver, an antioxidant, a weather resistance stabilizer, a light resistance stabilizer, an ultraviolet absorber, a heat stabilizer, a colorant, and a filler as desired.

According to at least one embodiment, the thermoplastic resin coat forming coating material can be obtained by mixing and stirring these components.

A resin coating film such as a hard coat or a thermoplastic resin coat can be formed using a coating material such as the active energy ray-curable resin composition or the thermoplastic resin coat forming coating material on a front side surface of the transparent resin film directly or via a transparent anchor coat. A method for forming such a resin coating film is not particularly limited, and a known web coating method can be used. Examples of the method include roll coating, gravure coating, reverse coating, roll brushing, spray coating, air knife coating, and die coating.

The thickness of the resin coating film is not particularly limited, but may be preferably 0.5 μm or more, and more preferably 5 μm or more from viewpoints of external scratch resistance and solvent resistance. Meanwhile, the thickness of the resin coating film may be preferably 100 μm or less, and more preferably 50 μm or less from a viewpoint of handling property of a web. The thickness of the resin coating film may be preferably 0.5 μm or more and 100 μm or less, 0.5 μm or more and 50 μm or less, 5 μm or more and 100 μm or less, or 5 μm or more and 50 μm or less.

An anchor coating agent used for forming the transparent anchor coat is not limited as long as being transparent, and any anchor coating agent can be used. Examples of the anchor coating agent include a known agent such as a polyester, an acrylate, a polyurethane, an acrylic urethane, or a polyester urethane. As the anchor coating agent, one or more of these compounds can be used.

A method for forming the transparent anchor coat using the anchor coating agent is not particularly limited, and a known web coating method can be used. Examples of the method include roll coating, gravure coating, reverse coating, roll brushing, spray coating, air knife coating, and die coating.

The thickness of the transparent anchor coat is usually about 0.1 to 5 μm, and preferably 0.5 to 2 μm.

As the surface protective layer, for example, a resin film having high transparency, high glossiness, excellent external scratch resistance, and excellent solvent resistance, such as a vinylidene fluoride-based resin film or a biaxially stretched polyethylene terephthalate film, may be laminated on a front side surface of a transparent resin film.

According to at least one embodiment, the vinylidene fluoride-based resin film can be obtained by forming a vinylidene fluoride-based resin into a film by any method. Examples of the vinylidene fluoride-based resin include a vinylidene fluoride homopolymer and a copolymer including 70 mol % or more of a constituent unit derived from vinylidene fluoride. These compounds can be used singly or in a mixture of two or more kinds thereof as the vinylidene fluoride-based resin. Examples of a monomer copolymerizable with vinylidene fluoride include ethylene tetrafluoride, propylene hexafluoride, ethylene trifluoride, ethylene trifluorochloride, and vinyl fluoride. These compounds can be used singly or in a mixture of two or more kinds thereof as a monomer copolymerized with vinylidene fluoride in order to obtain the copolymer. In addition, the vinylidene fluoride-based resin may include a lubricant, an antioxidant, a weather resistance stabilizer, a heat stabilizer, a release agent, an antistatic agent, a surfactant, a nucleating agent, a coloring material, a plasticizer, and the like within a range not contradictory to an object according to the various embodiments.

The melting point of each of these vinylidene fluoride-based resins is usually in a range of 145 to 180° C. This melting point is preferably 150 to 170° C. from a viewpoint of processability.

Incidentally, here, in a melting curve obtained by performing DSC measurement with a temperature program in which the temperature of a sample is held at 230° C. for five minutes, then lowered to −50° C. at a temperature falling rate of 10° C./min., held at −50° C. for five minutes, and then raised to 230° C. at a temperature rising rate of 10° C./min. using a Diamond DSC type differential scanning calorimeter available from Perkin Elmer Japan Co., Ltd, a peak top on a highest temperature side is defined as a melting point.

A method for laminating the transparent resin film and the vinylidene fluoride-based resin film is not limited, and lamination can be performed by any method. Examples of the method include a method including obtaining each of the transparent resin film and the vinylidene fluoride-based resin film by any method and then subjecting the resin films to dry lamination or heat lamination; a method including melting each constituent material with an extruder to obtain a laminated film by T-die co-extrusion using a feed block process, a multi-manifold process, or a stack plate process; and an extrusion lamination method including obtaining one of the transparent resin film and the vinylidene fluoride-based resin film by any method and then melting and extruding the other resin film onto the obtained resin film.

The biaxially stretched polyethylene terephthalate film is widely and commercially available, and any biaxially stretched polyethylene terephthalate film can be used.

A method for laminating the transparent resin film and the biaxially stretched polyethylene terephthalate film is not limited, and lamination can be performed by any method. Examples of the method include a method including obtaining each of the transparent resin film and the biaxially stretched polyethylene terephthalate film by any method and then subjecting the resin films to dry lamination; and an extrusion lamination method including melting and extruding the transparent resin film onto the biaxially stretched polyethylene terephthalate film.

Furthermore, the resin coating film may be formed on the biaxially stretched polyethylene terephthalate film or the vinylidene fluoride-based resin film directly or via an anchor coat.

The decorative sheet according to at least one embodiment has an initial adhesive strength with glass preferably of 15 N/25 mm or more, more preferably of 20 N/25 mm or more, still more preferably of 25 N/25 mm or more. In addition, the adhesive strength with glass may be preferably 50 N/25 mm or less and more preferably 45 N/25 mm or less in consideration of reworkability. Here, the adhesive strength with glass is a value measured according to the following test (i). The initial adhesive strength with glass may be preferably 15 N/25 mm or more and 50 N/25 mm or less, 15 N/25 mm or more and 45 N/25 mm or less, 20 N/25 mm or more and 50 N/25 mm or less, 20 N/25 mm or more and 45 N/25 mm or less, 25 N/25 mm or more and 50 N/25 mm or less, or 25 N/25 mm or more and 45 N/25 mm or less.

The decorative sheet according to at least one embodiment has an adhesive strength with glass preferably of 5 N/25 mm or more, more preferably of 10 N/25 mm or more, still more preferably of 15 N/25 mm or more after a heat treatment at a temperature of 60° C. for 10 minutes. Here, the adhesive strength with glass after the heat treatment at a temperature of 60° C. for 10 minutes is a value measured according to the following test (ii).

The decorative sheet according to at least one embodiment has an adhesive strength residual ratio with glass preferably of 70% or more, more preferably of 80% or more, still more preferably of 90% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours. The upper limit of the adhesive strength residual ratio is not particularly specified. Here, the adhesive strength residual ratio with glass after the heat cycle treatment under the conditions is a value measured according to the following measurement method (iii). Preferably, the decorative sheet according to at least one embodiment has an adhesive strength with glass of 5 N/25 mm or more, 10 N/25 mm or more, or 15 N/25 mm or more after a heat treatment at a temperature of 60° C. for 10 minutes and has an adhesive strength residual ratio with glass of 70% or more, 80% or more, or 90% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours.

The decorative sheet according to at least one embodiment has an adhesive strength residual ratio with glass preferably of 70% or more, more preferably of 80% or more, still more preferably of 90% or more after an immersion treatment in a sodium hydroxide aqueous solution having a concentration of 5% by mass and a temperature of 25° C. for 24 hours. The upper limit of the adhesive strength residual ratio is not particularly specified. Here, the adhesive strength residual ratio with glass after the immersion treatment under the conditions is a value measured according to the following test (iv). Preferably, the decorative sheet according to at least one embodiment has an adhesive strength with glass of 5 N/25 mm or more, 10 N/25 mm or more, or 15 N/25 mm or more after a heat treatment at a temperature of 60° C. for 10 minutes, has an adhesive strength residual ratio with glass of 70% or more, 80% or more, or 90% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours, and has an adhesive strength residual ratio with glass of 70% or more, 80% or more, or 90% or more after an immersion treatment in a sodium hydroxide aqueous solution having a concentration of 5% by mass and a temperature of 25° C. for 24 hours.

In the decorative sheet according to at least one embodiment, an initial adhesive strength with at least one resin selected from the group consisting of an acrylic resin, an aromatic polycarbonate-based resin, and a polyester-based resin other than the acrylic resin and the aromatic polycarbonate-based resin is preferably 15 N/25 mm or more, more preferably 20 N/25 mm or more, and still more preferably 25 N/25 mm or more. In addition, the initial adhesive strength with the resin may be preferably 50 N/25 mm or less and more preferably 45 N/25 mm or less in consideration of reworkability. Here, the adhesive strength with the resin is a value measured according to the following test (i). The initial adhesive strength with this resin may be preferably 15 N/25 mm or more and 50 N/25 mm or less, 15 N/25 mm or more and 45 N/25 mm or less, 20 N/25 mm or more and 50 N/25 mm or less, 20 N/25 mm or more and 45 N/25 mm or less, 25 N/25 mm or more and 50 N/25 mm or less, or 25 N/25 mm or more and 45 N/25 mm or less.

Incidentally, examples of the "acrylic resin", the "aromatic polycarbonate-based resin", and the "polyester-based resin other than the acrylic resin and the aromatic polycarbonate-based resin" referred to herein are described below in the section of the transparent resin sheet constituting a panel.

In the decorative sheet according to at least one embodiment, an adhesive strength with at least one resin selected from the group consisting of an acrylic resin, an aromatic polycarbonate-based resin, and a polyester-based resin other than the acrylic resin and the aromatic polycarbonate-based resin is preferably 5 N/25 mm or more, more preferably 10 N/25 mm or more, and still more preferably 15 N/25 mm or more after a heat treatment at a temperature of 60° C. for 10 minutes. Here, the adhesive strength with the resin after a heat treatment at a temperature of 60° C. for 10 minutes is a value measured according to the following test (ii).

In the decorative sheet according to at least one embodiment, an adhesive strength residual ratio with at least one resin selected from the group consisting of an acrylic resin, an aromatic polycarbonate-based resin, and a polyester-based resin other than the acrylic resin and the aromatic polycarbonate-based resin is preferably 70% or more, more preferably 80% or more, and still more preferably 90% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours. The upper limit of the adhesive strength residual ratio is not particularly specified. Here, the adhesive strength residual ratio with the resin after the heat cycle treatment under the conditions is a value measured according to the following measurement method (iii). Preferably, the decorative sheet according to at least one embodiment has an adhesive strength with the resin of 5 N/25 mm or more, 10 N/25 mm or more, or 15 N/25 mm or more after a heat treatment at a temperature of 60° C. for 10 minutes and has an adhesive strength residual ratio with the resin of 70% or more, 80% or more, or 90% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours.

In the decorative sheet according to at least one embodiment, an adhesive strength residual ratio with at least one resin selected from the group consisting of an acrylic resin, an aromatic polycarbonate-based resin, and a polyester-based resin other than the acrylic resin and the aromatic polycarbonate-based resin is preferably 70% or more, more preferably 80% or more, and still more preferably 90% or more after an immersion treatment in a sodium hydroxide aqueous solution having a concentration of 5% by mass and a temperature of 25° C. for 24 hours. The upper limit of the adhesive strength residual ratio is not particularly specified. Here, the adhesive strength residual ratio with the resin after the immersion treatment under the conditions is a value measured according to the following test (iv). Preferably, the decorative sheet according to at least one embodiment has an adhesive strength with the resin of 5 N/25 mm or more, 10 N/25 mm or more, or 15 N/25 mm or more after a heat treatment at a temperature of 60° C. for 10 minutes, has an adhesive strength residual ratio with the resin of 70% or more, 80% or more, or 90% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours, and has an adhesive strength residual ratio with the resin of 70% or more, 80% or more, or 90% or more after an immersion treatment in a sodium hydroxide aqueous solution having a concentration of 5% by mass and a temperature of 25° C. for 24 hours.

3. Panel

The front panel according to at least one embodiment constitutes a front of a door body for opening/closing a front part of an article main body. The front panel according to at least one embodiment has a structure in which the decorative sheet according to at least one embodiment is bonded to a panel substrate made of glass or a transparent resin sheet. In the front panel according to at least one embodiment, the decorative sheet includes, in order from a side to which the panel substrate is bonded, a layer including the pressure-sensitive adhesive according to at least one embodiment and a substrate layer including at least one layer (typically a resin film such as a transparent resin film or a colored resin film). That is, in one embodiment, the front panel according to at least one embodiment includes, in order from a front side of an article, (α) a layer of glass or a transparent resin sheet, (β) a layer including the pressure-sensitive adhesive according to at least one embodiment, and (γ) a layer of a resin film. In addition, in another embodiment, the front panel according to at least one embodiment includes, in order from a front side of an article, (γ) a layer of a resin film; (β) a layer including the pressure-sensitive adhesive according to at least one embodiment; and (α) a layer of glass or a transparent resin sheet. In these embodiments, (γ) the layer of a resin film may be replaced by a layer of another non-limiting material such as glass.

Hereinafter, a preferable embodiment will be described with reference to an example in which the front panel includes, in order from a front side of an article, (α) a layer of a transparent resin sheet, (β) a layer including the pressure-sensitive adhesive according to at least one embodiment, and (γ) a layer of a resin film.

The transparent resin sheet retains mechanical properties required for a front panel and serves to impart a glass-like design to the front panel. Therefore, preferably, the transparent resin sheet has high transparency and is not colored.

According to at least one embodiment, the transparent resin sheet has a total light transmittance (measured according to JIS K 7361-1:1997 using a turbidimeter "NDH2000" (trade name) available from Nippon Denshoku Industries Co., Ltd.) preferably of 80% or more, more preferably of 85% or more, still more preferably of 90% or more. A higher total light transmittance is more preferable.

The transparent resin sheet has a haze (measured according to JIS K 7136:2000 using a turbidimeter "NDH2000" (trade name) available from Nippon Denshoku Industries Co., Ltd.) preferably of 5% or less, more preferably of 3% or less, still more preferably of 2% or less. A lower haze is more preferable.

Furthermore, the transparent resin sheet has a yellowness index (measured according to JIS K 7105:1981 using a chromaticity meter "SolidSpec-3700" (trade name) available from Shimadzu Corporation) preferably of 3 or less, more preferably of 2 or less, still more preferably of 1 or less. A lower yellowness index is more preferable.

According to at least one embodiment, the thickness of the transparent resin sheet is usually 0.5 mm or more, preferably 0.8 mm or more, and more preferably 1.2 mm or more from viewpoints of retaining mechanical properties and imparting a deep design. Meanwhile, the thickness of the transparent resin sheet may be usually 10 mm or less, preferably 6 mm or less, and more preferably 3 mm or less from a viewpoint of meeting a demand for weight reduction of an article. The thickness of the transparent resin sheet may be usually 0.5 mm or more and 10 mm or less, preferably 0.5 mm or more and 6 mm or less, 0.5 mm or more and 3 mm or less, 0.8 mm or more and 10 mm or less, 0.8 mm or more and 6 mm or less, 0.8 mm or more and 0.3 mm or less, 1.2 mm or more and 10 mm or less, 1.2 mm or more and 6 mm or less, or 1.2 mm or more and 3 mm or less.

According to at least one embodiment, the transparent resin sheet has a tensile elastic modulus preferably of 1,500 MPa or more, more preferably of 1,800 MPa or more from a viewpoint of retaining strength and rigidity required as a front panel. The upper limit of the tensile elastic modulus is not particularly specified, but the tensile elastic modulus is about 10,000 MPa at most within a usually available range because of a resin sheet. The tensile elastic modulus was measured under conditions of a test piece type 1B and a drawing rate of 50 min/min according to JIS K7127:1999.

A resin constituting the transparent resin sheet has a glass transition temperature preferably of 90° C. or higher, more preferably of 100° C. or higher, still more preferably of 110° C. or higher from a viewpoint of retaining heat resistance required as a front panel (including both heat resistance required at the time of producing an article and heat resistance required at the time of using the article). Incidentally, in a case where the transparent resin sheet includes two or more kinds of resins as constituent resins, a resin having the lowest glass transition temperature among these resins preferably satisfies the range.

According to at least one embodiment, the glass transition temperature of a resin constituting the transparent resin sheet is preferably 160° C. or lower, more preferably 150° C. or lower, and still more preferably 140° C. or lower from a viewpoint of processability at the time of producing an article. Incidentally, in a case where the transparent resin sheet includes two or more kinds of resins as constituent resins, a resin having the highest glass transition temperature among these resins preferably satisfies the range.

Figure 2:
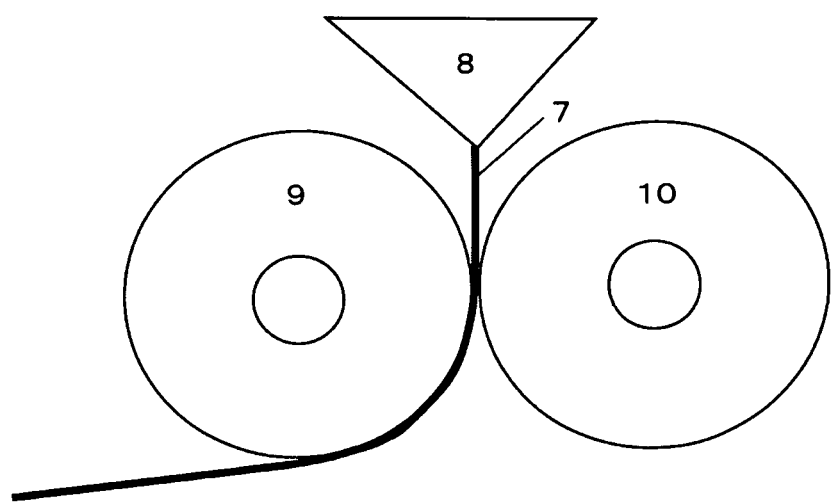
FIG. 2 is a conceptual diagram of an apparatus according to an embodiment used for producing a transparent resin sheet in Examples.

Here, the glass transition temperature of the transparent resin sheet is an intermediate point glass transition temperature calculated by drawing a graph in accordance with FIG. 2 of ASTM D3418 for glass transition appearing in a curve measured in the last temperature rising process in a temperature program in which the temperature of a sample is raised to 200° C. at a temperature rising rate of 50° C./min., held at 200° C. for 10 minutes, then lowered to 50° C. at a temperature falling rate of 20° C./min., held at 50° C. for 10 minutes, and then raised to 200° C. at a temperature rising rate of 20° C./min. using a Diamond DSC type differential scanning calorimeter available from Perkin Elmer Japan Co., Ltd.

According to at least one embodiment, the transparent resin sheet is not limited, and any transparent resin sheet can be used. Examples of the transparent resin sheet include a transparent resin sheet of a polyester-based resin such as an aromatic polyester or an aliphatic polyester; an acrylic resin; a polycarbonate-based resin; a polyolefin-based resin such as polyethylene, polypropylene, or polymethylpentene; a cellulose-based resin such as cellophane, triacetylcellulose, diacetylcellulose, or acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, or a styrene-ethylene-ethylene-propylene-styrene copolymer; a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, or polyethersulfone. These sheets include an unstretched sheet, a uniaxially stretched sheet, and a biaxially stretched sheet. In addition, the transparent resin sheet includes a laminated sheet obtained by laminating two or more layers of one or more kinds thereof.

In a case where the transparent resin sheet is a laminated sheet, a lamination method is not limited, and lamination can be performed by any method. Examples of the method include a method including obtaining each resin sheet by any method and then subjecting the resin sheets to dry lamination or heat lamination; a method including melting each constituent material with an extruder to obtain a laminated sheet by T-die co-extrusion using a feed block process, a multi-manifold process, or a stack plate process; an extrusion lamination method including obtaining at least one resin sheet by any method and then melting and extruding another resin sheet onto the obtained resin sheet; a method including forming a resin sheet by melt extrusion onto any film substrate or by applying and drying a coating material including a constituent material and a solvent thereonto, peeling the formed resin sheet from the film substrate, and transferring the resin sheet onto another resin sheet; and a method including two or more of these methods in any combination.

In a case where the transparent resin sheet is a laminated sheet, embossing may be applied between any layers as desired in order to enhance the sense of design.

In a case where the transparent resin sheet is a laminated sheet, a printed layer may be disposed between any layers as desired in order to enhance the sense of design. The printed layer can be formed by printing any pattern using any ink and any printing machine. At this time, printing may be performed partially or using a transparent ink from a viewpoint of further enhancing the sense of depth. In addition, the number of printed layers is not limited to one, but may be two or more.

Among these sheets, as the transparent resin sheet, the following (a1) to (a4) are preferable from viewpoints of mechanical properties, transparency, and non-coloration:

(a1) an acrylic resin sheet;
(a2) an aromatic polycarbonate-based resin sheet;
(a3) a polyester-based resin sheet (excluding a resin sheet formed of an acrylic resin or an aromatic polycarbonate-based resin); and
(a4) a laminated sheet formed of any one or more of the transparent resin sheets (a1) to (a3).

The (a1) acrylic resin sheet is formed of a resin mainly including an acrylic resin such as polymethyl methacrylate or polyethyl methacrylate (usually 50% by mass or more, preferably 60% by mass or more, more preferably 70% by mass or more).

Examples of the acrylic resin include a (meth)acrylate (co)polymer, a copolymer of comonomers include of a (meth)acrylate, and modified products thereof. Note that the term (meth)acrylic means acrylic or methacrylic. In addition, the term (co)polymer means a polymer or a copolymer.

Examples of the (meth)acrylate (co)polymer include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer of comonomers include of a (meth)acrylate include an ethylene-methyl (meth)acrylate copolymer, a styrene-methyl (meth)acrylate copolymer, a vinylcyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidating agent (for example, methyl amine, cyclohexyl amine, or ammonia).

These compounds can be used singly or in a mixture of two or more kinds thereof for the acrylic resin.

Preferable examples of an optional component which can be contained in the acrylic resin include a core-shell rubber. When the total amount of the acrylic resin and the core-shell rubber is 100 parts by mass, by usually using 0 to 50 parts by mass of the core-shell rubber (100 to 50 parts by mass of the acrylic resin), preferably 0 to 40 parts by mass of the core-shell rubber (100 to 60 parts by mass of the acrylic resin), more preferably 0 to 30 parts by mass of the core-shell rubber (100 to 70 parts by mass of the acrylic resin), cutting processability and impact resistance of the (a1) acrylic resin sheet can be enhanced. Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof for the core-shell rubber.

In addition, examples of another optional component which can be contained in the acrylic resin include a thermoplastic resin other than the acrylic resin and the core-shell rubber; a pigment, an inorganic filler, an organic filler, and a resin filler; and an additive such as a lubricant, an antioxidant, a weather resistance stabilizer, a heat stabilizer, a release agent, an antistatic agent, a nucleating agent, or a surfactant. The blending amount of these optional components may be usually 25 parts by mass or less, and is preferably about 0.01 to 10 parts by mass when the total amount of the acrylic resin and the core-shell rubber is 100 parts by mass.

The (a2) aromatic polycarbonate-based resin sheet is formed of a resin mainly including an aromatic polycarbonate-based resin (usually 50% by mass or more, preferably 70% by mass or more, more preferably 90% by mass or more).

Examples of the aromatic polycarbonate-based resin include a polymer obtained by an interfacial polymerization method for an aromatic dihydroxy compound such as bisphenol A, dimethyl bisphenol A, or 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, or 1,1-bis(4-hydroxyphenyl)-3,3,5-trimethylcyclohexane and a carbonate diester such as diphenyl carbonate. These compounds can be used singly or in a mixture of two or more kinds thereof for the aromatic polycarbonate-based resin.

Preferable examples of an optional component which can be contained in the aromatic polycarbonate-based resin include a core-shell rubber. When the total amount of the aromatic polycarbonate-based resin and the core-shell rubber is 100 parts by mass, by using 0 to 30 parts by mass of the core-shell rubber (100 to 70 parts by mass of the aromatic polycarbonate-based resin), preferably 0 to 10 parts by mass of the core-shell rubber (100 to 90 parts by mass of the aromatic polycarbonate-based resin), cutting processability and impact resistance of the (a2) aromatic polycarbonate-based resin can be enhanced.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof for the core-shell rubber.

In addition, the aromatic polycarbonate-based resin may further include, as desired, a thermoplastic resin other than an aromatic polycarbonate-based resin and a core-shell rubber; a pigment, an inorganic filler, an organic filler, and a resin filler; and an additive such as a lubricant, an antioxidant, a weather resistance stabilizer, a heat stabilizer, a release agent, an antistatic agent, or a surfactant within a range not contradictory to an object of the various embodiments. The blending amount of these optional components may be usually about 0.01 to 10 parts by mass when the total amount of the aromatic polycarbonate-based resin and the core-shell rubber is 100 parts by mass.

According to at least one embodiment, the (a3) polyester-based resin sheet is formed of a resin mainly including a polyester-based resin such as polyethylene terephthalate (usually 50% by mass or more, preferably 80% by mass or more, more preferably 90% by mass or more) (provided that the (a1) acrylic resin sheet and the (a2) aromatic polycarbonate-based resin sheet are excluded from the scope of the (a3) polyester-based resin sheet). The polyester-based resin sheet includes an unstretched sheet, a uniaxially stretched sheet, and a biaxially stretched sheet. In addition, the polyester-based resin sheet also includes a laminated sheet obtained by laminating one or more kinds of these sheets.

According to at least one embodiment, the (a3) polyester-based resin sheet is preferably formed of a resin mainly including an amorphous or low crystalline aromatic polyester-based resin (usually 50% by mass or more, preferably 80% by mass or more, more preferably 90% by mass or more).

Examples of the amorphous or low crystalline aromatic polyester-based resin include a polyester-based copolymer formed of an aromatic polycarboxylic acid component such as terephthalic acid, isophthalic acid, orthophthalic acid, or naphthalene dicarboxylic acid and a polyhydric alcohol component such as ethylene glycol, diethylene glycol, neopentyl glycol, 1,2-butanediol, 1,3-butanediol, 1,4-butanediol, 1,5-pentanediol, 3-methyl-1,5-pentanediol, 2-methyl-1,3-propanediol, or 1,4-cyclohexanedimethanol.

Examples of the amorphous or low crystalline aromatic polyester resin include one or a mixture of two or more types of glycol-modified polyethylene terephthalate (PETG) containing 50 mol % of terephthalic acid, 30 to 40 mol % of ethylene glycol, and 10 to 20 mol % of 1,4-cyclohexanedimethanol; glycol-modified polycyclohexylenedimethylene terephthalate (PCTG) containing 50 mol % of terephthalic acid, 16 to 21 mol % of ethylene glycol, and 29 to 34 mol % of 1,4-cyclohexanedimethanol; acid-modified polycyclohexylenedimethylene terephthalate (PCTA) containing 25 to 49.5 mol % of terephthalic acid, 0.5 to 25 mol % of isophthalic acid, and 50 mol % of 1,4-cyclohexanedimethanol; acid-modified and glycol-modified polyethylene terephthalate containing 30 to 45 mol % of terephthalic acid, 5 to 20 mol % of isophthalic acid, 35 to 48 mol % of ethylene glycol, 2 to 15 mol % of neopentyl glycol, less than 1 mol % of diethylene glycol, and less than 1 mol % of bisphenol A; and acid-modified and glycol-modified polyethylene terephthalate containing 45 to 50 mol % of terephthalic acid, 5 to 0 mol % of isophthalic acid, 25 to 45 mol % of 1,4-cyclohexanedimethanol, and 25 to 5 mol % of 2,2,4,4,-tetramethyl-1,3-cyclobutanediol, when the total amount of monomers is 100 mol %.

Here, in a second melting curve (i.e., a melting curve measured in the last temperature rising process) measured with a temperature program in which the temperature of a sample is held at 320° C. for five minutes, then lowered to −50° C. at a temperature falling rate of 20° C./min., held at −50° C. for five minutes, and then raised to 320° C. at a temperature rising rate of 20° C./min. using a Diamond DSC type differential scanning calorimeter available from Perkin Elmer Japan Co., Ltd, a polyester having a heat of fusion of 10 J/g or less was defined as an amorphous resin, and a polyester having a heat of fusion of more than 10 J/g and 60 J/g or less was defined as a low crystalline resin.

The polyester-based resin may include another component as desired within a range not contradictory to an object of the various embodiments. Examples of the optional component which can be contained in the polyester-based resin include a thermoplastic resin other than the polyester-based resin; a pigment, an inorganic filler, an organic filler, and a resin filler; and an additive such as a lubricant, an antioxidant, a weather resistance stabilizer, a heat stabilizer, a release agent, an antistatic agent, and a surfactant. The blending amount of these optional components may be usually 25 parts by mass or less, preferably about 0.01 to 10 parts by mass when the amount of the polyester-based resin is 100 parts by mass.

Preferable examples of an optional component which can be contained in the polyester-based resin include a core-shell rubber. By using the core-shell rubber, impact resistance of the (a3) polyester-based resin sheet can be improved.

Examples of the core-shell rubber include a single core-shell rubber of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, or a methacrylate-acrylonitrile/acrylate rubber graft copolymer, and a mixture of two or more kinds thereof. These compounds can be used singly or in a mixture of two or more kinds thereof for the core-shell rubber.

When the amount of the polyester-based resin is 100 parts by mass, the blending amount of the core-shell rubber is preferably 0.5 parts by mass or more in order to improve impact resistance. Meanwhile, the blending amount of the core-shell rubber is preferably 5 parts by mass or less, and more preferably 3 parts by mass or less in order to retain transparency.

According to at least one embodiment, the (a4) laminated sheet formed of any one or more of the transparent resin sheets (a1) to (a3) can be obtained by co-extrusion film formation so as to obtain a desired layer structure using any co-extrusion apparatus, for example, a feed block type, a multi-manifold type, or a stack plate type; by obtaining any one or more of the transparent resin sheets (a1) to (a3) using any film-forming apparatus and then subjecting the obtained sheets to heat lamination or dry lamination so as to obtain a desired layer structure; or by obtaining any one of the transparent resin sheets (a1) to (a3) using any film-forming apparatus and then performing extrusion lamination so as to obtain a desired layer structure using the obtained sheet as a substrate.

A printed layer may be disposed on a back side surface of the transparent resin sheet as desired in order to enhance the sense of design. The printed layer can be disposed in order to impart high designability to the front panel according to at least one embodiment. The printed layer can be formed by printing any pattern using any ink and any printing machine. A detailed method for forming the printed layer is as described above in the section of the decorative sheet.

In a case where the front panel according to at least one embodiment includes, in order from a front side of an article, (α) a layer of a transparent resin sheet, (β) a layer including the pressure-sensitive adhesive according to at least one embodiment, and (γ) a layer of a resin film, the decorative sheet according to the first or second embodiment can be preferably used, for example, as the decorative sheet according to at least one embodiment.

In a case where the front panel according to at least one embodiment includes, in order from a front side of an article, (γ) a layer of a resin film; (β) a layer including the pressure-sensitive adhesive according to at least one embodiment; and (α) a layer of glass or a transparent resin sheet, the decorative sheet according to the third embodiment can be preferably used, for example, as the decorative sheet according to at least one embodiment.

In a case where the front panel according to at least one embodiment includes, in order from a front side of an article, (α) a layer of a transparent resin sheet, (β) a layer including the pressure-sensitive adhesive according to at least one embodiment, and (γ) a layer of a resin film, the front panel according to at least one embodiment preferably further includes a surface protective layer on a surface on the (α) layer side. The surface protective layer can increase external scratch resistance and solvent resistance. In this case, as the surface protective layer, those described above in the description of the decorative sheet according to the third embodiment can be used.

The front panel according to at least one embodiment can be obtained by cutting a laminated sheet having, in this order, (α) a layer of a transparent resin sheet; (β) a layer including the pressure-sensitive adhesive according to at least one embodiment; and (γ) a layer of a resin film using any method.

Examples of the cutting method include router processing, water jet processing, laser processing, punching processing, and a combination thereof.

The router processing is a processing method for performing cutting by a mill rotating at a high speed. This method is characterized by having smooth finish of a cut surface. In addition, this method is computer-controlled and has excellent dimensional stability and reproducibility.

The water jet processing is a processing method for injecting water pressurized to an ultrahigh pressure (about 4,000 atmospheres at maximum) from a nozzle having an extremely small diameter (usually about 0.1 mmΦ) and performing cutting using high-speed and high-density ultrahigh pressure water energy. This method is superior in that a thermal influence on an object to be cut is small. In addition, this method may be performed by mixing an abrasive with water.

The laser processing is a processing method for melting and evaporating a material at a cutting position of a workpiece by matching a focus of a laser to the cutting position of the workpiece.

The punching processing is a processing method for placing a workpiece on a Thomson die with a steel blade (Thomson blade) disposed on a support base and pressing the workpiece to punch out the workpiece. In this method, the die is inexpensive, the degree of freedom of correspondence to various shapes is large, and productivity is excellent.

Among these methods, the punching processing is preferable due to a large degree of freedom of correspondence to various shapes and excellent productivity.

FIG. 1 is a conceptual diagram of a cross section illustrating an example of the front panel according to at least one embodiment. The front panel includes, in order from a front side, a surface protective layer 1, a layer of a transparent resin sheet (panel substrate) 2, a layer 3 including the pressure-sensitive adhesive according to at least one embodiment, a layer 4 of a transparent resin film, a printed layer 5, and a layer 6 of a colored resin film.

Examples of the article according to at least one embodiment are not particularly limited, but include an article such as a refrigerator, a washing machine, a cupboard, or a costume shelf; door bodies and lid bodies of these articles; and all parts for incorporation into a door body and a lid body.

EXAMPLES

Hereinafter, the various embodiments will be described with reference to Examples, but the various embodiments are not limited thereto.

Method for Measuring and Evaluating Physical Properties

Methods for measuring and evaluating physical properties relating to a decorative sheet will be described.

(i) Adhesive Strength (i-1) Initial Adhesive Strength Between Glass Plate and Decorative Sheet Using a float plate glass (thickness 3 mm) specified in JIS R3202:2011 available from Testpiece, Co., Ltd. as a test plate, a 180 degree peeling adhesive force of a decorative sheet with respect to the test plate was measured in accordance with JIS A5759:2008 at a speed of 300 mm/min. at a temperature of 23° C.

(i-2 to i-6) Initial Adhesive Strength Between Each of Transparent Resin Sheets (E-1 to E-5) and Decorative Sheet A peeling adhesive force of a decorative sheet was measured in a similar manner to the (i-1) except that a test plate (width 50 mm, length 125 mm) punched out from each of the following five kinds of transparent resin sheets (E-1 to E-5) such that a machine direction thereof coincided with a length direction of the test piece was used instead of the float glass plate and a surface of the test plate on a first mirror-finished roll (described later) side was bonded to the decorative sheet.

(ii) Adhesiveness Under Heat

An adhesive force of a decorative sheet after a heat treatment was measured in a similar manner to the test (i) except that a test piece was subjected to a heat treatment at a temperature of 60° C. for 10 minutes and then an adhesive force was measured.

(iii) Heat Cycle Resistance

An adhesive force of a decorative sheet after a heat cycle was measured in a similar manner to the test (i) except that a test piece was subjected to a treatment in which three cycles were performed in total, one cycle being a treatment for exposing the test piece to an environment of a temperature of −30° C. and a relative humidity of 90% for six hours and then exposing the test piece to an environment of a temperature of 60° C. and a relative humidity of 90% for six hours, and then an adhesive force was measured. Subsequently, a ratio of the adhesive force after the heat cycle with respect to a value of the test (i) (adhesive strength residual ratio) was calculated.

(iv) Alkali Resistance

An adhesive force of a decorative sheet after an immersion treatment was measured in a similar manner to the test (i) except that a test piece was immersed in a sodium hydroxide aqueous solution having a concentration of 5% by mass and a temperature of 25° C. for 24 hours and then an adhesive force was measured. Subsequently, a ratio of the adhesive force after the immersion treatment with respect to a value of the test (i) (adhesive strength residual ratio) was calculated.

(v) Resistance to Knocking Flaw Occurrence

A decorative sheet was visually observed from the float glass plate side or the following transparent resin sheet side while a stainless steel ball having a diameter of 1 mm was pressed with a force of 1 N against the decorative sheet side of a test piece prepared in a similar manner to the test (i), and the decorative sheet was evaluated according to the following criteria.

○ (good): A pressing point of the ball cannot be visually recognized.

x (poor): A pressing point of the ball can be visually recognized clearly.

(vi) Resistance to Peeling Under Moisture and Heat

An adhesive force of a decorative sheet after a moisture and heat treatment was measured in a similar manner to the test (i) except that a test piece was exposed to an environment of a temperature of 60° C. and a relative humidity of 98% for 400 hours and then the adhesive force was measured. Subsequently, a ratio of the adhesive force after the immersion treatment with respect to a value of the test (i) (adhesive strength residual ratio) was calculated.

(vii) Resistance to Whitening Under Moisture and Heat

In the test (vi), before an adhesive force after the moisture and heat treatment was measured, a pressure-sensitive adhesive layer was visually observed and evaluated according to the following criteria.

○ (good): No change is recognized in transparency of a pressure-sensitive adhesive layer as compared with the pressure-sensitive adhesive layer before exposure.

Δ (slightly poor): It is recognized that whitening has occurred as compared with the pressure-sensitive adhesive layer before exposure, but the degree of whitening is not large.

x (poor): It is recognized that whitening has occurred to a considerable degree.

(viii) Warm Water Resistance

An adhesive force of a decorative sheet after a warm water treatment was measured in a similar manner to the test (i) except that a test piece was immersed in water at a temperature of 50° C. for 240 hours and then the adhesive force was measured. Subsequently, a ratio of the adhesive force after the warm water treatment with respect to a value of the test (i) (adhesive strength residual ratio) was calculated.

(ix) Resistance to Whitening in Warm Water

In the test (viii), before an adhesive force after the warm water treatment was measured, a pressure-sensitive adhesive layer was visually observed and evaluated according to the following criteria.

○ (good): No change is recognized in transparency of a pressure-sensitive adhesive layer as compared with the pressure-sensitive adhesive layer before exposure.

Δ (slightly poor): It is recognized that whitening has occurred as compared with the pressure-sensitive adhesive layer before exposure, but the degree of whitening is not large.

x (poor): It is recognized that whitening has occurred to a considerable degree.

Raw Materials Used (A) Acrylic Polymer Having a Glass Transition Temperature of −50 to −25° C.

(A-1) "acrybase LKG-1010" (trade name) available from Fujikura Kasei Co., Ltd.: glass transition temperature −34° C., acid value 1.9 mg KOH/g, weight average molecular weight 850,000

(A-2) "acrybase LKG-1007" (trade name) available from Fujikura Kasei Co., Ltd.: glass transition temperature −44° C., acid value 2.1 mg KOH/g, weight average molecular weight 1,000,000

(A-3) "acrybase LKG-1001" (trade name) available from Fujikura Kasei Co., Ltd.: glass transition temperature −40° C., acid value 7 mg KOH/g, weight average molecular weight 1,000,000

(A') Acrylic Polymer for Reference (A'-1) "acrybase LKG-1011" (trade name) available from Fujikura Kasei Co., Ltd.: glass transition temperature −53° C., acid value 1.9 mg KOH/g, weight average molecular weight 1,000,000

(A'-2) "acrybase LKG-1101" (trade name) available from Fujikura Kasei Co., Ltd.: glass transition temperature −22° C., acid value 0.3 mg KOH/g, weight average molecular weight 430,000

(B) Silane Coupling Agent Having an Epoxy Group (B-1) 3-glycidoxypropyltrimethoxysilane "KBM-403" (trade name) available from Shin-Etsu Chemical Co., Ltd.

(B-2) 3-glycidoxypropyltriethoxysilane "KBE-403" (trade name) available from Shin-Etsu Chemical Co., Ltd.

(B') Silane Coupling Agent for Reference (B'-1) 3-methacryloxypropyltrimethoxysilane "Z-6030" (trade name) available from Dow Corning Toray Co.

(B'-2) 3-aminopropyltrimethoxysilane "KBM-903" (trade name) available from Shin-Etsu Chemical Co., Ltd.

(B'-3) vinyltrimethoxysilane "KBM-1003" (trade name) available from Shin-Etsu Chemical Co., Ltd.

(B'-4) 3-mercaptopropyltrimethoxysilane "KBM-803" (trade name) available from Shin-Etsu Chemical Co., Ltd.

(B'-5) 3-isocyanatepropyltriethoxysilane "KBM-9007" (trade name) available from Shin-Etsu Chemical Co., Ltd.

(C) Compound Having Two or More Epoxy Groups in One Molecule Thereof (C-1) 1,3-bis(N,N'-diglycidylaminomethyl) cyclohexane (D) Organic Polyvalent-Metal Compound (D-1) aluminum trisacetylacetonate (E) Transparent Resin Sheet (E-1) Acrylic resin sheet Using an acrylic resin composition (i.e., a resin composition formed of 70 parts by mass of an acrylic resin and 30 parts by mass of an acrylic core-shell rubber) "HT03Y" (trade name) available from Sumitomo Chemical Co., Ltd. and using an apparatus equipped with an extruder and a T-die 8 (see FIG. 2), a melted sheet 7 of the resin was continuously extruded from the T-die 8, and the melted sheet 7 was supplied and introduced between a rotating first mirror-finished roll 9 (a roll to hold the melted sheet 7 and send the melted sheet 7 to a subsequent transfer roll) and a rotating second mirror-finished roll 10 and pressed to obtain a transparent resin sheet having a thickness of 1.2 mm. As setting conditions at this time, a set temperature of the first mirror-finished roll was 100° C., a set temperature of the second mirror-finished roll was 80° C., and a resin temperature at an outlet of the T-die was 300° C. The transparent resin sheet thus obtained had a total light transmittance of 86%, a haze of 2.7%, and a yellowness index of 0.7.

Note that the film-forming apparatus schematically illustrated in FIG. 2 was also used for producing the following resin sheets (E-2) to (E-5).

(E-2) Aromatic Polycarbonate-Based Resin Sheet

A transparent resin sheet having a thickness of 1.2 mm was obtained in a similar manner to the (E-1) sheet except that a resin composition formed of 99.5 parts by mass of an aromatic polycarbonate-based resin "K-1300Y" (trade name) available from Teijin Kasei Co., Ltd. and 0.5 parts by mass of a core-shell rubber (i.e., a methacrylate-styrene/butadiene rubber graft copolymer) "Kane Ace B-56" (trade name)) available from Kaneka Corporation was used. As setting conditions at this time, a set temperature of the first mirror-finished roll was 140° C., a set temperature of the second mirror-finished roll was 120° C., and a resin temperature at an outlet of the T-die was 300° C. The transparent resin sheet thus obtained had a total light transmittance of 88%, a haze of 2.3%, and a yellowness index of 0.8.

(E-3) Polyester-Based Resin Sheet 1

A transparent resin sheet having a thickness of 1.2 mm was obtained in a similar manner to the (E-1) sheet except that a resin composition formed of 99 parts by mass of an amorphous polyester-based resin (i.e., a PETG resin) "Cadence GS1" (trade name) available from Eastman Chemical Company and 1 part by mass of a core-shell rubber (i.e., a methacrylate-styrene/butadiene rubber graft copolymer) "Kane Ace B-56" (trade name)) available from Kaneka Corporation were used. As setting conditions at this time, a set temperature of the first mirror-finished roll was 80° C., a set temperature of the second mirror-finished roll was 40° C., and a resin temperature at an outlet of the T-die was 200° C. The transparent resin sheet thus obtained had a total light transmittance of 85%, a haze of 3.0% and a yellowness index of 0.5.

(E-4) Polyester-Based Resin Sheet 2

A transparent resin sheet having a thickness of 1.2 mm was obtained in a similar manner to the (E-1) sheet except that a resin composition formed of 99 parts by mass of an amorphous polyester-based resin "Tritan FX 200" (trade name) available from Eastman Chemical Company and 1 part by mass of a core-shell rubber (i.e., a methacrylate-styrene/butadiene rubber graft copolymer) "Kane Ace B-56" (trade name)) available from Kaneka Corporation were used. As setting conditions at this time, a set temperature of the first mirror-finished roll was 80° C., a set temperature of the second mirror-finished roll was 40° C., and a resin temperature at an outlet of the T-die was 200° C. The transparent resin sheet thus obtained had a total light transmittance of 85%, a haze of 3.0% and a yellowness index of 0.5.

(E-5) Laminated Sheet

Using a two-kind/three-layer multi-manifold type co-extrusion film-forming apparatus equipped with an extruder and a T-die, a melted laminated sheet having both outer layers of an acrylic resin "Optimas 7500R" (trade name) available from Mitsubishi Gas Chemical Company and having an intermediate layer of an aromatic polycarbonate "CALIBRE 302-4" (trade name) available from Sumika Stylon Polycarbonate Limited was continuously extruded from the T-die. The melted laminated sheet was supplied and introduced between a rotating first mirror-finished roll (a roll to hold the melted sheet and send the melted sheet to a subsequent transfer roll) and a rotating second mirror-finished roll and pressed to obtain a transparent resin sheet having a total thickness of 1.2 mm, a thickness of each of both the outer layers of 0.1 mm, and a thickness of an intermediate layer of 1 mm. As setting conditions at this time, a set temperature of the first mirror-finished roll was 140° C., a set temperature of the second mirror-finished roll was 120° C., and a resin temperature at an outlet of the T-die was 300° C. The transparent resin sheet thus obtained had a total light transmittance of 91%, a haze of 1.0%, and a yellowness index of 0.7.

(F) Resin Film (F-1) a transparent biaxially stretched polyethylene terephthalate-based resin film subjected to an easy adhesion treatment on both surfaces: thickness 25 μm (F-2) a black colored polyvinyl chloride-based resin film (brightness measured according to JIS Z8721:1993: 2.3): thickness 80 μm (G) Adhesive (G-1) vinyl chloride-vinyl acetate-acrylic copolymer-based adhesive "VTP-NT" (trade name) available from DIC Graphics Co., Ltd.

Example 1

100 parts by mass of the component (A-1), 0.057 parts by mass of the component (B-1), 0.077 parts by mass of the component (C-1), and 0.023 parts by mass of the component (D-1) in terms of solid content were mixed and stirred to obtain a pressure-sensitive adhesive. Subsequently, one surface of the (F-1) film was printed. Subsequently, the (G-1) adhesive was applied onto the formed printed layer using a knife coater so as to have a dry film thickness of 15 μm and dried. Thereafter, the resin sheet (F-2) was laminated on the applied surface under a condition of a surface temperature of a laminate roll of 150° C. Subsequently, a pressure-sensitive adhesive layer having a thickness of 20 μm was formed on the other surface of the (F-1) film using the pressure-sensitive adhesive obtained above with a comma coating type coating apparatus to obtain a decorative sheet. The obtained decorative sheet was subjected to the tests (i) to (ix) for measuring and evaluating physical properties. Table 1 or 2 illustrates results thereof.

Examples 2 to 21

Production of a decorative sheet and measurement and evaluation of physical properties thereof were all performed in a similar manner to Example 1 except that blending of the pressure-sensitive adhesive was changed as illustrated in each of Tables 1, 3, and 5. The results are illustrated in Tables 1 to 6.

Example 1S 100 parts by mass of the component (A-1), 0.057 parts by mass of the component (B'-2), 0.077 parts by mass of the component (C-1), and 0.023 parts by mass of the component (D-1) in terms of solid content were mixed and stirred to obtain a strongly yellowed pressure-sensitive adhesive. The obtained pressure-sensitive adhesive was not preferable for design applications, and therefore evaluation tests were not performed.

Example 2S 100 parts by mass of the component (A-1), 0.057 parts by mass of the component (B'-3), 0.077 parts by mass of the component (C-1), and 0.023 parts by mass of the component (D-1) in terms of solid content were mixed and stirred to obtain a strongly clouded pressure-sensitive adhesive. The obtained pressure-sensitive adhesive was not preferable for design applications, and therefore evaluation tests were not performed.

Example 3S 100 parts by mass of the component (A-1), 0.057 parts by mass of the component (B'-4), 0.077 parts by mass of the component (C-1), and 0.023 parts by mass of the component (D-1) in terms of solid content were mixed and stirred to obtain a strongly clouded pressure-sensitive adhesive. The obtained pressure-sensitive adhesive was not preferable for design applications, and therefore an evaluation test was not performed.

Example 4S 100 parts by mass of the component (A-1), 0.057 parts by mass of the component (B'-5), 0.077 parts by mass of the component (C-1), and 0.023 parts by mass of the component (D-1) in terms of solid content were mixed and stirred to obtain a gelled pressure-sensitive adhesive. Therefore, evaluation tests were not performed.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Blending of pressure-sensitive adhesive (parts by mass) | A-1 | 100 | — | — | — | — | 100 | 100 |
| | A-2 | — | 100 | — | — | — | — | — |
| | A-3 | — | — | 100 | — | — | — | — |
| | A'-1 | — | — | — | 100 | — | — | — |
| | A'-2 | — | — | — | — | 100 | — | — |
| | B-1 | 0.057 | 0.057 | 0.057 | 0.057 | 0.057 | — | 0.50 |
| | B-2 | — | — | — | — | — | — | — |
| | B'-1 | — | — | — | — | — | — | — |
| | B'-2 | — | — | — | — | — | — | — |
| | B'-3 | — | — | — | — | — | — | — |
| | B'-4 | — | — | — | — | — | — | — |
| | B'-5 | — | — | — | — | — | — | — |
| | C-1 | 0.077 | 0.077 | 0.077 | 0.077 | 0.077 | 0.077 | 0.077 |
| | D-1 | 0.023 | 0.023 | 0.023 | 0.023 | 0.023 | 0.023 | 0.023 |
| Evaluation result (with respect to glass) | Adhesive strength N/25 mm | 27.3 | 21.1 | 21.8 | 22.4 | 5.2 | 22.2 | 18.1 |
| | Adhesiveness under heat N/25 mm | 17.3 | 12.6 | 13.1 | 9.0 | 3.1 | 8.5 | 11.8 |
| | Heat cycle resistance % | 152 | 147 | 139 | 132 | 52 | 55 | 161 |
| | Alkali resistance % | 144 | 140 | 141 | 138 | 140 | 64 | 107 |
| | Resistance to knocking flaw occurrence | ○ | ○ | ○ | X | ○ | ○ | ○ |
| | Resistance to peeling under moisture and heat % | 114 | 105 | 102 | 101 | 88 | 57 | 119 |
| | Resistance to whitening under moisture and heat | ○ | ○ | ○ | ○ | ○ | ○ | ○ |
| | Warm water resistance % | 158 | 146 | 142 | 140 | 122 | 60 | 165 |
| | Resistance to whitening in warm water | ○ | ○ | ○ | ○ | ○ | ○ | ○ |
| Evaluation result (with respect to E-1) | Adhesive strength N/25 mm | 25.3 | 19.6 | 20.2 | 20.8 | 4.8 | 20.6 | 16.8 |
| | Adhesiveness under heat N/25 mm | 17.1 | 12.5 | 13.0 | 8.9 | 3.1 | 8.4 | 11.7 |
| | Heat cycle resistance % | 110 | 106 | 105 | 107 | 108 | 58 | 110 |
| | Alkali resistance % | 108 | 105 | 109 | 109 | 108 | 62 | 106 |
| | Resistance to knocking flaw occurrence | ○ | ○ | ○ | X | ○ | ○ | ○ |
| | Resistance to peeling under moisture and heat % | 114 | 113 | 107 | 114 | 116 | 59 | 114 |
| | Resistance to whitening under moisture and heat | ○ | ○ | ○ | ○ | ○ | ○ | ○ |
| | Warm water resistance % | 110 | 105 | 107 | 265 | 242 | 59 | 110 |
| | Resistance to whitening in warm water | ○ | ○ | ○ | ○ | ○ | ○ | ○ |

TABLE 2

| | | Ex. 1 | Ex. 2 | Ex. 3 | Ex. 4 | Ex. 5 | Ex. 6 | Ex. 7 |
|---|---|---|---|---|---|---|---|---|
| Evaluation result (with respect to E-2) | Adhesive strength N/25 mm | 26.0 | 20.1 | 20.8 | 21.3 | 5.0 | 21.1 | 17.2 |
| | Adhesiveness under heat N/25 mm | 19.3 | 14.0 | 14.6 | 10.0 | 3.5 | 9.5 | 13.2 |
| | Heat cycle resistance % | 116 | 152 | 144 | 136 | 54 | 57 | 113 |
| | Alkali resistance % | 100 | 137 | 138 | 135 | 137 | 63 | 99 |
| | Resistance to knocking flaw occurrence | ○ | ○ | ○ | X | ○ | ○ | ○ |
| | Resistance to peeling under moisture and heat % | 116 | 195 | 190 | 188 | 164 | 64 | 115 |
| | Resistance to whitening under moisture and heat | ○ | ○ | ○ | ○ | ○ | ○ | ○ |
| | Warm water resistance % | 110 | 265 | 258 | 255 | 222 | 61 | 108 |
| | Resistance to whitening in warm water | ○ | ○ | ○ | ○ | ○ | ○ | ○ |
| Evaluation result (with respect to E-3) | Adhesive strength N/25 mm | 17.2 | 13.3 | 13.7 | 14.1 | 3.3 | 14.0 | 11.4 |
| | Adhesiveness under heat N/25 mm | 15.9 | 11.6 | 12.1 | 8.3 | 2.9 | 7.8 | 10.9 |
| | Heat cycle resistance % | 147 | 196 | 185 | 176 | 69 | 65 | 144 |
| | Alkali resistance % | 101 | 148 | 149 | 146 | 148 | 67 | 99 |
| | Resistance to knocking flaw occurrence | ○ | ○ | ○ | X | ○ | ○ | ○ |

TABLE 2-continued

|  |  | Ex. 1 | Ex. 2 | Ex. 3 | Ex. 4 | Ex. 5 | Ex. 6 | Ex. 7 |
|---|---|---|---|---|---|---|---|---|
| | Resistance to peeling under moisture and heat % | 151 | 257 | 250 | 247 | 215 | 59 | 149 |
| | Resistance to whitening under moisture and heat | ○ | ○ | ○ | ○ | ○ | ○ | ○ |
| | Warm water resistance % | 152 | 346 | 336 | 333 | 290 | 57 | 148 |
| | Resistance to whitening in warm water | ○ | ○ | ○ | ○ | ○ | ○ | ○ |
| Evaluation result (with respect to E-4) | Adhesive strength N/25 mm | 17.4 | 13.4 | 13.9 | 14.2 | 3.3 | 14.1 | 11.5 |
| | Adhesiveness under heat N/25 mm | 16.3 | 11.8 | 12.3 | 8.5 | 2.9 | 8.0 | 11.1 |
| | Heat cycle resistance % | 128 | 176 | 167 | 158 | 62 | 66 | 126 |
| | Alkali resistance % | 107 | 156 | 157 | 153 | 156 | 65 | 105 |
| | Resistance to knocking flaw occurrence | ○ | ○ | ○ | X | ○ | ○ | ○ |
| | Resistance to peeling under moisture and heat % | 132 | 242 | 235 | 233 | 203 | 65 | 130 |
| | Resistance to whitening under moisture and heat | ○ | ○ | ○ | ○ | ○ | ○ | ○ |
| | Warm water resistance % | 129 | 326 | 317 | 314 | 273 | 64 | 126 |
| | Resistance to whitening in warm water | ○ | ○ | ○ | ○ | ○ | ○ | ○ |
| Evaluation result (with respect to E-5) | Adhesive strength N/25 mm | 23.4 | 18.1 | 18.7 | 19.2 | 4.5 | 19.0 | 15.5 |
| | Adhesiveness under heat N/25 mm | 17.6 | 12.9 | 13.4 | 9.2 | 3.2 | 8.7 | 12.0 |
| | Heat cycle resistance % | 101 | 135 | 128 | 121 | 48 | 50 | 100 |
| | Alkali resistance % | 101 | 146 | 147 | 144 | 146 | 66 | 101 |
| | Resistance to knocking flaw occurrence | ○ | ○ | ○ | X | ○ | ○ | ○ |
| | Resistance to peeling under moisture and heat % | 106 | 177 | 172 | 170 | 148 | 54 | 104 |
| | Resistance to whitening under moisture and heat | ○ | ○ | ○ | ○ | ○ | ○ | ○ |
| | Warm water resistance % | 102 | 240 | 233 | 231 | 201 | 54 | 101 |
| | Resistance to whitening in warm water | ○ | ○ | ○ | ○ | ○ | ○ | ○ |

TABLE 3

|  |  | Ex. 8 | Ex. 9 | Ex. 10 | Ex. 11 | Ex. 12 | Ex. 13 | Ex. 14 |
|---|---|---|---|---|---|---|---|---|
| Blending of pressure-sensitive adhesive (parts by mass) | A-1 | 100 | 100 | 100 | 100 | 100 | 100 | 100 |
| | A-2 | — | — | — | — | — | — | — |
| | A-3 | — | — | — | — | — | — | — |
| | A'-1 | — | — | — | — | — | — | — |
| | A'-2 | — | — | — | — | — | — | — |
| | B-1 | 1.0 | 5.0 | 0.057 | 0.057 | 0.057 | 0.057 | 0.057 |
| | B-2 | — | — | — | — | — | — | — |
| | B'-1 | — | — | — | — | — | — | — |
| | B'-2 | — | — | — | — | — | — | — |
| | B'-3 | — | — | — | — | — | — | — |
| | B'-4 | — | — | — | — | — | — | — |
| | B'-5 | — | — | — | — | — | — | — |
| | C-1 | 0.077 | 0.077 | — | 0.30 | 0.46 | 0.60 | 1.0 |
| | D-1 | 0.023 | 0.023 | 0.060 | 0.060 | 0.023 | 0.023 | 0.060 |
| Evaluation result (with respect to glass) | Adhesive strength N/25 mm | 29.6 | 12.9 | 12.6 | 15.2 | 39.9 | 43.2 | 7.8 |
| | Adhesiveness under heat N/25 mm | 12.4 | 8.2 | 4.7 | 9.9 | 20.1 | 21.5 | 2.6 |
| | Heat cycle resistance % | 85 | 43 | 76 | 144 | 113 | 108 | 314 |
| | Alkali resistance % | 91 | 12 | 92 | 139 | 99 | 90 | 221 |
| | Resistance to knocking flaw occurrence | ○ | ○ | ○ | ○ | ○ | ○ | ○ |
| | Resistance to peeling under moisture and heat % | 110 | 107 | 90 | 111 | 64 | 59 | 113 |
| | Resistance to whitening under moisture and heat | ○ | ○ | ○ | ○ | ○ | ○ | ○ |
| | Warm water resistance % | 142 | 103 | 89 | 154 | 111 | 123 | 124 |
| | Resistance to whitening in warm water | ○ | ○ | ○ | ○ | ○ | ○ | ○ |
| Evaluation result (with respect to E-1) | Adhesive strength N/25 mm | 27.4 | 12.0 | 11.7 | 29.3 | 37.0 | 40.1 | 7.2 |
| | Adhesiveness under heat N/25 mm | 12.3 | 8.1 | 4.7 | 18.2 | 19.9 | 21.3 | 2.6 |
| | Heat cycle resistance % | 88 | 42 | 98 | 109 | 109 | 120 | 301 |
| | Alkali resistance % | 92 | 15 | 101 | 108 | 107 | 108 | 215 |
| | Resistance to knocking flaw occurrence | ○ | ○ | ○ | ○ | ○ | ○ | ○ |
| | Resistance to peeling under moisture and heat % | 90 | 106 | 100 | 115 | 116 | 106 | 110 |
| | Resistance to whitening under moisture and heat | ○ | ○ | ○ | ○ | ○ | ○ | ○ |
| | Warm water resistance % | 89 | 104 | 98 | 110 | 111 | 121 | 108 |
| | Resistance to whitening in warm water | ○ | ○ | ○ | ○ | ○ | ○ | ○ |

TABLE 4

|  |  | Ex. 8 | Ex. 9 | Ex. 10 | Ex. 11 | Ex. 12 | Ex. 13 | Ex. 14 |
|---|---|---|---|---|---|---|---|---|
| Evaluation result (with respect to E-2) | Adhesive strength N/25 mm | 28.2 | 12.3 | 12.0 | 31.3 | 38.0 | 41.1 | 7.4 |
| | Adhesiveness under heat N/25 mm | 13.8 | 9.1 | 4.6 | 20.1 | 22.4 | 24.0 | 2.9 |
| | Heat cycle resistance % | 88 | 44 | 79 | 116 | 117 | 112 | 299 |
| | Alkali resistance % | 89 | 12 | 90 | 98 | 97 | 88 | 210 |
| | Resistance to knocking flaw occurrence | ○ | ○ | ○ | ○ | ○ | ○ | ○ |

TABLE 4-continued

|  |  | Ex. 8 | Ex. 9 | Ex. 10 | Ex. 11 | Ex. 12 | Ex. 13 | Ex. 14 |
|---|---|---|---|---|---|---|---|---|
|  | Resistance to peeling under moisture and heat % | 86 | 103 | 89 | 117 | 119 | 120 | 110 |
|  | Resistance to whitening under moisture and heat | ○ | ○ | ○ | ○ | ○ | ○ | ○ |
|  | Warm water resistance % | 88 | 101 | 86 | 112 | 114 | 115 | 107 |
|  | Resistance to whitening in warm water | ○ | ○ | ○ | ○ | ○ | ○ | ○ |
| Evaluation result (with respect to E-3) | Adhesive strength N/25 mm | 18.6 | 8.1 | 7.9 | 19.5 | 25.1 | 27.2 | 4.9 |
|  | Adhesiveness under heat N/25 mm | 11.4 | 7.5 | 4.3 | 17.2 | 18.5 | 19.8 | 2.4 |
|  | Heat cycle resistance % | 113 | 57 | 101 | 149 | 151 | 153 | 316 |
|  | Alkali resistance % | 96 | 13 | 97 | 103 | 105 | 107 | 225 |
|  | Resistance to knocking flaw occurrence | ○ | ○ | ○ | ○ | ○ | ○ | ○ |
|  | Resistance to peeling under moisture and heat % | 115 | 111 | 98 | 154 | 157 | 159 | 115 |
|  | Resistance to whitening under moisture and heat | ○ | ○ | ○ | ○ | ○ | ○ | ○ |
|  | Warm water resistance % | 116 | 109 | 97 | 158 | 162 | 170 | 113 |
|  | Resistance to whitening in warm water | ○ | ○ | ○ | ○ | ○ | ○ | ○ |
| Evaluation result (with respect to E-4) | Adhesive strength N/25 mm | 18.8 | 8.2 | 8.0 | 19.7 | 25.4 | 27.5 | 5.0 |
|  | Adhesiveness under heat N/25 mm | 11.7 | 7.7 | 4.4 | 17.4 | 18.9 | 20.2 | 2.4 |
|  | Heat cycle resistance % | 102 | 52 | 89 | 130 | 136 | 140 | 315 |
|  | Alkali resistance % | 101 | 13 | 80 | 108 | 110 | 108 | 220 |
|  | Resistance to knocking flaw occurrence | ○ | ○ | ○ | ○ | ○ | ○ | ○ |
|  | Resistance to peeling under moisture and heat % | 105 | 109 | 88 | 139 | 148 | 150 | 113 |
|  | Resistance to whitening under moisture and heat | ○ | ○ | ○ | ○ | ○ | ○ | ○ |
|  | Warm water resistance % | 103 | 99 | 86 | 130 | 131 | 132 | 110 |
|  | Resistance to whitening in warm water | ○ | ○ | ○ | ○ | ○ | ○ | ○ |
| Evaluation result (with respect to E-5) | Adhesive strength N/25 mm | 25.4 | 11.1 | 10.8 | 28.0 | 34.2 | 37.0 | 6.7 |
|  | Adhesiveness under heat N/25 mm | 12.6 | 8.4 | 4.7 | 19.1 | 20.5 | 21.9 | 2.7 |
|  | Heat cycle resistance % | 78 | 39 | 70 | 102 | 104 | 99 | 280 |
|  | Alkali resistance % | 95 | 12 | 96 | 102 | 103 | 100 | 215 |
|  | Resistance to knocking flaw occurrence | ○ | ○ | ○ | ○ | ○ | ○ | ○ |
|  | Resistance to peeling under moisture and heat % | 97 | 104 | 86 | 107 | 108 | 110 | 102 |
|  | Resistance to whitening under moisture and heat | ○ | ○ | ○ | ○ | ○ | ○ | ○ |
|  | Warm water resistance % | 99 | 101 | 84 | 102 | 103 | 104 | 105 |
|  | Resistance to whitening in warm water | ○ | ○ | ○ | ○ | ○ | ○ | ○ |

TABLE 5

|  |  | Ex. 15 | Ex. 16 | Ex. 17 | Ex. 18 | Ex. 19 | Ex. 20 | Ex. 21 |
|---|---|---|---|---|---|---|---|---|
| Blending of pressure-sensitive adhesive (parts by mass) | A-1 | 100 | 100 | 100 | 100 | 100 | 100 | 100 |
|  | A-2 | — | — | — | — | — | — | — |
|  | A-3 | — | — | — | — | — | — | — |
|  | A'-1 | — | — | — | — | — | — | — |
|  | A'-2 | — | — | — | — | — | — | — |
|  | B-1 | 0.057 | 0.057 | 0.057 | 0.057 | 0.057 | — | — |
|  | B-2 | — | — | — | — | — | 0.057 | — |
|  | B'-1 | — | — | — | — | — | — | 0.057 |
|  | B'-2 | — | — | — | — | — | — | — |
|  | B'-3 | — | — | — | — | — | — | — |
|  | B'-4 | — | — | — | — | — | — | — |
|  | B'-5 | — | — | — | — | — | — | — |
|  | C-1 | 0.090 | 0.090 | 0.090 | 0.040 | 0.090 | 0.077 | 0.077 |
|  | D-1 | — | 0.30 | 1.0 | 0.060 | 0.010 | 0.023 | 0.023 |
| Evaluation result (with respect to glass) | Adhesive strength N/25 mm | 15.6 | 15.4 | 16.2 | 26.2 | 26.4 | 24.2 | 18.2 |
|  | Adhesiveness under heat N/25 mm | 4.5 | 10.0 | 6.5 | 20.8 | 18.3 | 11.2 | 4.7 |
|  | Heat cycle resistance % | 84 | 95 | 56 | 161 | 139 | 179 | 97 |
|  | Alkali resistance % | 123 | 119 | 84 | 162 | 134 | 163 | 79 |
|  | Resistance to knocking flaw occurrence | ○ | ○ | ○ | ○ | ○ | ○ | ○ |
|  | Resistance to peeling under moisture and heat % | 103 | 105 | 91 | 116 | 110 | 119 | 107 |
|  | Resistance to whitening under moisture and heat | ○ | ○ | ○ | ○ | ○ | ○ | ○ |
|  | Warm water resistance % | 90 | 101 | 86 | 120 | 138 | 117 | 103 |
|  | Resistance to whitening in warm water | ○ | ○ | ○ | ○ | ○ | ○ | ○ |
| Evaluation result (with respect to E-1) | Adhesive strength N/25 mm | 14.5 | 14.3 | 15.0 | 24.3 | 24.5 | 22.4 | 16.9 |
|  | Adhesiveness under heat N/25 mm | 4.5 | 9.9 | 6.4 | 18.2 | 18.1 | 11.1 | 4.7 |
|  | Heat cycle resistance % | 61 | 72 | 44 | 110 | 72 | 103 | 100 |
|  | Alkali resistance % | 90 | 88 | 67 | 108 | 101 | 98 | 90 |
|  | Resistance to knocking flaw occurrence | ○ | ○ | ○ | ○ | ○ | ○ | ○ |
|  | Resistance to peeling under moisture and heat % | 99 | 116 | 119 | 113 | 105 | 105 | 95 |
|  | Resistance to whitening under moisture and heat | ○ | ○ | ○ | ○ | ○ | ○ | ○ |
|  | Warm water resistance % | 97 | 114 | 118 | 110 | 106 | 103 | 90 |
|  | Resistance to whitening in warm water | ○ | ○ | ○ | ○ | ○ | ○ | ○ |

TABLE 6

|  |  | Ex. 15 | Ex. 16 | Ex. 17 | Ex. 18 | Ex. 19 | Ex. 20 | Ex. 21 |
|---|---|---|---|---|---|---|---|---|
| Evaluation result (with respect to E-2) | Adhesive strength N/25 mm | 14.9 | 14.7 | 15.4 | 25.0 | 25.1 | 23.0 | 17.3 |
| | Adhesiveness under heat N/25 mm | 4.7 | 11.1 | 7.2 | 18.9 | 20.4 | 12.5 | 4.8 |
| | Heat cycle resistance % | 87 | 92 | 58 | 115 | 97 | 107 | 100 |
| | Alkali resistance % | 85 | 83 | 63 | 105 | 95 | 100 | 89 |
| | Resistance to knocking flaw occurrence | ○ | ○ | ○ | ○ | ○ | ○ | ○ |
| | Resistance to peeling under moisture and heat % | 90 | 108 | 100 | 115 | 97 | 108 | 101 |
| | Resistance to whitening under moisture and heat | ○ | ○ | ○ | ○ | ○ | ○ | ○ |
| | Warm water resistance % | 88 | 107 | 99 | 113 | 98 | 106 | 98 |
| | Resistance to whitening in warm water | ○ | ○ | ○ | ○ | ○ | ○ | ○ |
| Evaluation result (with respect to E-3) | Adhesive strength N/25 mm | 9.8 | 9.7 | 10.2 | 16.5 | 16.6 | 15.2 | 11.4 |
| | Adhesiveness under heat N/25 mm | 4.1 | 9.2 | 6.0 | 13.1 | 16.8 | 10.3 | 4.3 |
| | Heat cycle resistance % | 112 | 88 | 68 | 146 | 122 | 143 | 129 |
| | Alkali resistance % | 83 | 73 | 59 | 105 | 93 | 120 | 84 |
| | Resistance to knocking flaw occurrence | ○ | ○ | ○ | ○ | ○ | ○ | ○ |
| | Resistance to peeling under moisture and heat % | 101 | 74 | 61 | 144 | 103 | 141 | 127 |
| | Resistance to whitening under moisture and heat | ○ | ○ | ○ | ○ | ○ | ○ | ○ |
| | Warm water resistance % | 98 | 72 | 60 | 140 | 101 | 137 | 123 |
| | Resistance to whitening in warm water | ○ | ○ | ○ | ○ | ○ | ○ | ○ |
| Evaluation result (with respect to E-4) | Adhesive strength N/25 mm | 9.9 | 9.8 | 10.3 | 16.7 | 16.8 | 15.4 | 11.6 |
| | Adhesiveness under heat N/25 mm | 4.2 | 9.4 | 6.1 | 13.0 | 17.2 | 10.5 | 4.4 |
| | Heat cycle resistance % | 101 | 76 | 60 | 130 | 107 | 125 | 116 |
| | Alkali resistance % | 91 | 81 | 68 | 108 | 115 | 105 | 90 |
| | Resistance to knocking flaw occurrence | ○ | ○ | ○ | ○ | ○ | ○ | ○ |
| | Resistance to peeling under moisture and heat % | 98 | 85 | 67 | 131 | 125 | 130 | 115 |
| | Resistance to whitening under moisture and heat | ○ | ○ | ○ | ○ | ○ | ○ | ○ |
| | Warm water resistance % | 97 | 83 | 65 | 127 | 124 | 127 | 113 |
| | Resistance to whitening in warm water | ○ | ○ | ○ | ○ | ○ | ○ | ○ |
| Evaluation result (with respect to E-5) | Adhesive strength N/25 mm | 13.4 | 13.2 | 13.9 | 22.5 | 22.6 | 20.7 | 15.6 |
| | Adhesiveness under heat N/25 mm | 4.6 | 10.2 | 6.6 | 17.9 | 18.7 | 11.4 | 4.8 |
| | Heat cycle resistance % | 77 | 78 | 51 | 110 | 78 | 98 | 89 |
| | Alkali resistance % | 85 | 75 | 53 | 100 | 89 | 102 | 82 |
| | Resistance to knocking flaw occurrence | ○ | ○ | ○ | ○ | ○ | ○ | ○ |
| | Resistance to peeling under moisture and heat % | 88 | 80 | 57 | 105 | 98 | 108 | 100 |
| | Resistance to whitening under moisture and heat | ○ | ○ | ○ | ○ | ○ | ○ | ○ |
| | Warm water resistance % | 86 | 79 | 55 | 104 | 97 | 105 | 97 |
| | Resistance to whitening in warm water | ○ | ○ | ○ | ○ | ○ | ○ | ○ |

From these experimental results, it has been found that a decorative sheet having a layer including a preferable pressure-sensitive adhesive according to at least one embodiment is excellent in pressure-sensitive adhesive strength with glass, moisture and heat resistance, heat resistance, transparency, and hardness, and therefore the above-described disadvantages concerning peeling in a foam insulation material filling process, peeling in an environment of high temperature and high humidity, and knocking flaw occurrence can be eliminated. In addition, it has been found that a decorative sheet having a layer including a preferable pressure-sensitive adhesive according to at least one embodiment is excellent in pressure-sensitive adhesive strength with a transparent resin sheet, moisture and heat resistance, heat resistance, transparency, and hardness, and therefore the above-described disadvantages concerning peeling in a foam insulation material filling process, peeling caused by outgas in an environment of high temperature and high humidity, and knocking flaw occurrence can be eliminated.

Embodiments provide non-obvious advantages over conventional pressure-sensitive adhesives. Various embodiments can be suitably used for bonding glass to a decorative sheet and bonding a transparent resin sheet to a decorative sheet. In addition, the pressure-sensitive adhesive according to various embodiments can be suitably used for obtaining a front panel or a flat panel (including a glass panel and a transparent resin sheet panel) having a glass-like design and an article including these panels.

REFERENCE SIGNS LIST

1 Surface protective layer
2 Layer of transparent resin sheet
3 Pressure-sensitive adhesive layer
4 Layer of transparent resin film
5 Printed layer
6 Layer of colored resin film
7 Melted sheet
8 T-die
9 First mirror-finished roll
10 Second mirror-finished roll

The invention claimed is:
1. A decorative sheet, comprising:
a layer comprising a pressure-sensitive adhesive comprising:
100 parts by mass of (A) an acrylic polymer having a glass transition temperature of −40 to −25° C.;
0.01 to 3 parts by mass of (B) a silane coupling agent having an epoxy group;
0.01 to 0.9 parts by mass of (C) a compound having two or more epoxy groups in one molecule thereof; and
0.01 to 0.5 parts by mass of (D) an organic polyvalent-metal compound; and
a resin film layer as a substrate layer on which the layer comprising the pressure-sensitive adhesive is formed,
wherein the (B) silane coupling agent having an epoxy group and the (C) compound having two or more epoxy groups in one molecule thereof are the only compounds reactive to the (A) acrylic polymer having a glass transition temperature of −40 to −25° C. contained in the pressure-sensitive adhesive, and
wherein the pressure-sensitive adhesive does not comprise a compound having two or more isocyanate groups in one molecule thereof.

2. The decorative sheet according to claim 1, wherein an adhesive strength with glass is 5 N/25 mm or more after a heat treatment at a temperature of 60° C. for 10 minutes.

3. The decorative sheet according to claim 1, wherein an adhesive strength residual ratio with glass is 70% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours.

4. The decorative sheet according to claim 1, wherein an adhesive strength residual ratio with glass is 70% or more after an immersion treatment in a sodium hydroxide aqueous solution having a concentration of 5% by mass and a temperature of 25° C. for 24 hours.

5. The decorative sheet according to claim 1, wherein an adhesive strength with at least one resin selected from the group consisting of an acrylic resin, an aromatic polycarbonate resin, and a polyester resin other than the acrylic resin and the aromatic polycarbonate resin is 5 N/25 mm or more after a heat treatment at a temperature of 60° C. for 10 minutes.

6. The decorative sheet according to claim 1, wherein an adhesive strength residual ratio with at least one resin selected from the group consisting of an acrylic resin, an aromatic polycarbonate resin, and a polyester resin other than the acrylic resin and the aromatic polycarbonate resin is 70% or more after a heat cycle treatment in which three cycles are performed in total, one cycle being a treatment for exposing the sheet to an environment of a temperature of −30° C. and a relative humidity of 90% for six hours and then exposing the sheet to an environment of a temperature of 60° C. and a relative humidity of 90% for six hours.

7. The decorative sheet according to claim 1, wherein an adhesive strength residual ratio with at least one resin selected from the group consisting of an acrylic resin, an aromatic polycarbonate resin, and a polyester resin other than the acrylic resin and the aromatic polycarbonate resin is 70% or more after an immersion treatment in a sodium hydroxide aqueous solution having a concentration of 5% by mass and a temperature of 25° C. for 24 hours.

8. An article comprising the decorative sheet according to claim 1.

* * * * *